(12) United States Patent
Kuramoto et al.

(10) Patent No.: US 7,561,774 B2
(45) Date of Patent: Jul. 14, 2009

(54) OPTICAL WAVEGUIDE

(75) Inventors: Keiichi Kuramoto, Kadoma (JP); Hiroaki Izu, Hirakata (JP); Mitsuaki Matsumoto, Osaka (JP); Youhei Nakagawa, Hirakata (JP); Hitoshi Hirano, Nishinomiya (JP); Nobuhiko Hayashi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 798 days.

(21) Appl. No.: 10/797,053

(22) Filed: Mar. 11, 2004

(65) Prior Publication Data
US 2004/0179804 A1    Sep. 16, 2004

(30) Foreign Application Priority Data
Mar. 12, 2003   (JP)   ............... 2003-065888

(51) Int. Cl.
*G02B 6/10*   (2006.01)
(52) U.S. Cl. ............ 385/131; 385/132; 385/129; 385/130
(58) Field of Classification Search ............ None
See application file for complete search history.

(56) References Cited

U.S. PATENT DOCUMENTS

| | | | |
|---|---|---|---|
| 6,222,972 B1 * | 4/2001 | Yamamoto et al. | 385/127 |
| 6,229,949 B1 * | 5/2001 | Ido et al. | 385/145 |
| 6,917,749 B2 * | 7/2005 | Gao et al. | 385/145 |
| 2002/0018633 A1 | 2/2002 | Imaizumi | 385/132 |
| 2005/0265685 A1 * | 12/2005 | Ohashi et al. | 385/147 |

FOREIGN PATENT DOCUMENTS

| | | |
|---|---|---|
| JP | 6-331845 A | 12/1994 |
| JP | 7-304869 A | 11/1995 |
| JP | 9-230155 A | 9/1997 |
| JP | 9-311234 A | 12/1997 |
| JP | 10-62638 A | 3/1998 |
| JP | 10-101717 A | 4/1998 |
| JP | 2000-191925 A | 7/2000 |
| JP | 2001-141950 A | 5/2001 |
| JP | 2001-183539 A | 7/2001 |
| JP | 2001-242334 A | 9/2001 |
| JP | 2001-255425 A | 9/2001 |
| JP | 2001-255426 A | 9/2001 |
| JP | 2001-264562 A | 9/2001 |

(Continued)

OTHER PUBLICATIONS

Miyadera, Nobuo, "Polymer Material for Optical Waveguide", *Optical Alliance*, p. 13, 2, 1999.

*Primary Examiner*—Frank G Font
*Assistant Examiner*—Erin Chiem
(74) *Attorney, Agent, or Firm*—Kubovcik & Kubovcik

(57) ABSTRACT

In the optical waveguide which comprises a core layer to be an optical transmission region and an upper clad layer and a lower clad layer covering the surrounding of the core layer and of which the upper clad layer is formed while being shrunk in the volume, a stress moderating layer formed a material with a smaller storage modulus than that of the upper clad layer is formed between the upper clad layer and the lower clad layer in at least a portion of a region where the upper clad layer and the lower clad layer are brought into contact with each other.

13 Claims, 21 Drawing Sheets

FOREIGN PATENT DOCUMENTS

| | | | |
|---|---|---|---|
| JP | 2001255426 A | * | 9/2001 |
| JP | 2001-296438 A | | 10/2001 |
| JP | 2001-337239 A | | 12/2001 |
| JP | 2002-22984 A | | 1/2002 |
| JP | 2002-71993 A | | 3/2002 |
| JP | 2002-237684 A | | 8/2002 |
| JP | 2002-311276 A | | 10/2002 |
| JP | 2002-341162 A | | 11/2002 |
| JP | 2002-540450 A | | 11/2002 |
| JP | 2003248130 A | * | 9/2003 |
| JP | 2003-311276 A | | 11/2003 |
| JP | 2004046282 A | * | 12/2004 |

* cited by examiner

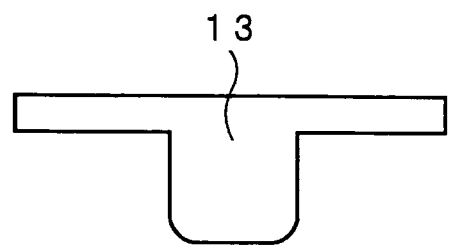
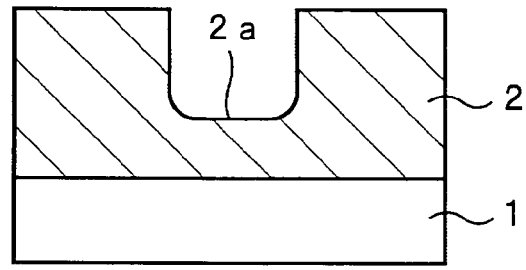
FIG.13(c)
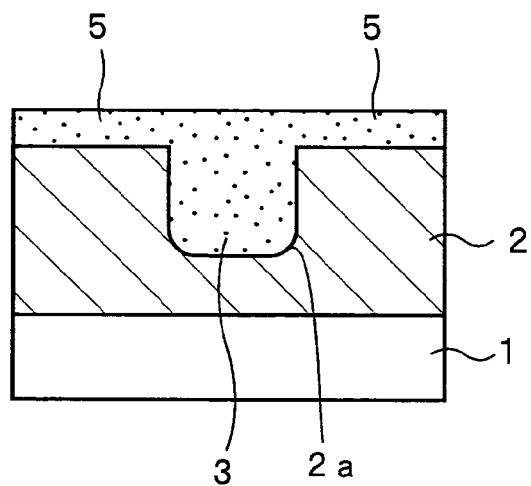
FIG.13(d)
FIG.14
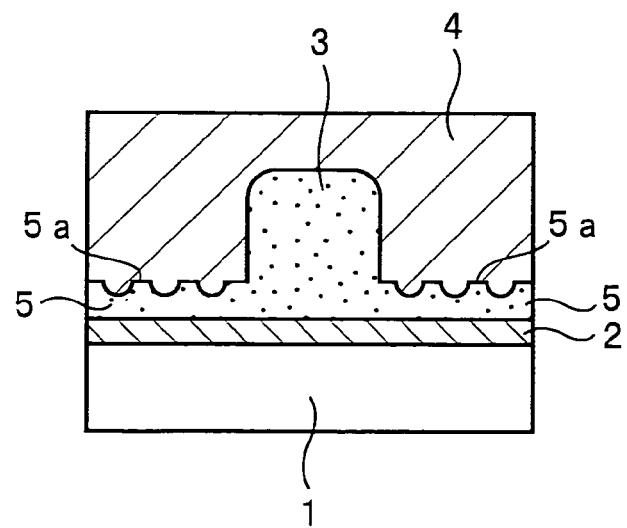

OPTICAL WAVEGUIDE

BACKGROUND OF THE INVENTION

1. Field of the Invention

The invention relates to an optical waveguide usable for optical interconnection, optical modulator, optical integrated circuits, optical switches, distributors, optical transmitter-receiver modules and the like and a device for optical communication using the optical waveguide.

2. Related Art

In the situation of recent advancement of broad-band for internet, in order to make access such as FTTH widely available, considerable cost down of devices for optical communication is urgent necessity. As a device for optical communication, an optical transmitter-receiver module for converting optical signals into electric signals is employed for a terminal device of an optical communication appliance. In order to miniaturize the optical transmitter-receiver module and lower its cost, a method for producing an optical waveguide, which is a part disposed in the module, from an organic polymer material is proposed (Nobuo MIYADERA, "Polymer Material for Optical Waveguide", Optical Alliance, p. 13, 2, 1999).

For example, a lower clad layer is formed on a substrate and an optical transmission layer of an optical polymer material is formed on the lower clad layer. The optical transmission layer is formed by forming a pattern with RIE or UV radiation by employing photolithography and removing unnecessary parts. An upper clad layer is formed on the optical transmission layer formed in such a manner. In many cases, both of the lower clad layer and the upper clad layer are formed from organic polymer materials.

However, in the case the upper clad layer of the optical waveguide is formed from a material such as an organic-inorganic composite or a resin material which is shrunk in volume at the time of curing, the volume is shrunk at the time of upper clad layer formation and that is adverse consequence that the lower clad layer tends to be easily cracked or peeled.

SUMMARY OF THE INVENTION

The purpose of the invention is to provide an innovative structure of an optical waveguide in which occurrence of cracking and peeling of a lower clad layer and an upper clad layer is efficiently prevented and a device for optical communication using the optical waveguide.

The optical waveguide of the invention comprises a core layer to be an optical transmission region and an upper clad layer and a lower clad layer covering the surrounding of the core layer and is characterized in that the upper clad layer is formed while being shrunk in the volume and that a stress moderating layer for moderating the stress caused by volume shrinkage of the upper clad layer is formed between the upper clad layer and the lower clad layer in at least a portion of a region where the upper clad layer and the lower clad layer are brought into contact with each other.

Owing to formation of the stress moderating layer between the upper clad layer and the lower clad layer according to the invention, the stress caused by the volume shrinkage at the time of upper clad layer formation can be moderated by the stress moderating layer. Accordingly, in the lower clad layer and the upper clad layer, occurrence of cracking, peeling and the like can efficiently be prevented.

In the invention, the stress moderating layer is preferably formed from a material with a smaller storage modulus than that of a material for the upper clad layer. In general, if the stress with sinusoidal alteration is applied to a polymer material, the strain shows sinusoidal waveform with same frequency and phase delayed by 5. The storage modulus is the scale of the energy stored for every one cycle and completely recovered and can be measured by a dynamic viscoelasticity measurement apparatus.

In the case the upper clad layer is formed from an organic-inorganic composite, the storage modulus of the stress moderating layer is preferably 100000 kgf/cm$^2$ or lower, more preferably 50000 kgf/cm$^2$ or lower, at 30° C. The stress moderating layer may also be formed from an organic-inorganic composite. The lower limit of the storage modulus of the stress moderating layer is not particularly limited, however-in general, it is preferably, more preferably 10000 kgf/cm$^2$ or higher at 30° C. Incidentally, hereinafter, the storage modulus all means that at 30° C.

In the invention, the core layer and/or the lower clad layer may be formed from an organic-inorganic composite.

The organic-inorganic composites in the invention are produced from, for example, organic polymers and metal alkoxides. The organic-inorganic composites may be formed from at least one kind of metal alkoxides. In this case, it is preferable formed from at least two kinds of metal alkoxides.

With respect to the above-mentioned organic-inorganic composites, the combinations of organic polymers and metal alkoxides or combinations of at least two kinds of metal alkoxides are properly adjusted so as to adjust the refractive index of an ultimately formed organic-inorganic composite.

As the metal alkoxides, metal alkoxides comprising polymerizable groups to be polymerized by light or heat may be used. In this case, a metal alkoxide comprising a polymerizable group to be polymerized by light or heat and a metal alkoxide comprising no polymerizable group are preferably used in combination. The above-mentioned polymerizable groups may include methacryloxy, acryloxy, vinyl, styryl, and the like.

In the case metal alkoxides comprising polymerizable groups are used, the polymerizable groups of the metal alkoxides are preferably polymerized by light or heat.

The metal alkoxides may include alkoxides of Si, Ti, Zr, Al, Nb, Sn, Zn, and the like. Alkoxides of Si, Ti or Zr are preferable to be used. Accordingly, alkoxysilane, titanium alkoxide, and zirconium alkoxide are preferable to be used. Alkoxysilane is particularly preferable to be used.

Alkoxysilane may include tetraethoxysilane, tetramethoxysilane, tetra-n-propoxysilane, tetraisopropoxysilane, tetra-n-butoxysilane, tetraisobutoxysilane, phenyltriethoxysilane (PhTES), phenyltrimethoxysilane (PhTMS), diphenyldiethoxysilane, diphenyldimethoxysilane and the like.

The foregoing alkoxisilane comprising polymerizable group may include 3-methacryloxypropyltriethoxysilane (MPTES), 3-methacryloxypropyltrimethoxysilane (MPTMS), 3-methacryloxypropylmethyldimethoxysilane, 3-acryloxypropyltrimethoxysilane, p-styryltriethoxysilane, p-styryltrimethoxysilane, vinyltrimethoxysilane, vinyltriethoxysilane, and the like.

The titanium alkoxide may include titanium isopropoxide, titanium butoxide and the like. The zirconium alkoxide may include zirconium isoproxide, zirconium butoxide and the like. The niobium alkoxide may include niobium pentaethoxide and the like.

As the metal alkoxides, the above-mentioned compounds can be used and in general, metal alkoxides having a general formula: $M(OR)_n$, $R'M(OR)_{n-1}$, and $R'_2M(OR)_{n-2}$ (wherein M denotes a metal; n denotes 2, 3, 4, or 5; and R and R' independently denote an organic group) can be used. The organic group may include organic groups comprising an alkyl, an aryl, and the foregoing polymerizable groups, and the like. M particularly denotes, as described above, Si, Ti, Zr, Al, Nb, Sn, Zn, and the like. Incidentally, as the alkyl group, C1 to C5 alkyl groups are preferable.

In the case an organic-inorganic composite is produced from an organic polymer and a metal oxide, the organic polymer is not particularly limited if it can form the organic-inorganic composite in combination with a metal alkoxide. The organic polymer may include a high polymer having a carboxyl group, a high polymer having a benzene ring, and a high polymer having a naphthalene ring.

The organic polymer may include practically, for example, polyvinylpyrrolidone, polycarbonates, poly(methyl methacrylate), polyamides, polyimides, polystyrene, polyethylene, polyprolen, epoxy resins, phenol-resins, acrylic resins, urea resins, melamine resins, and the like. In terms of formation of an organic-inorganic composite with excellent optical transparency, polyvinylpyrrolidone, polycarbonates, poly(methyl methacrylate), polystyrene, epoxy resins, and their mixtures are preferably used.

In the invention, the storage modulus of the storage moderating layer, upper clad layer, and other layers in the case of the respective layers are formed from organic-inorganic composites can be measured by forming samples for the storage modulus measurement by using the solutions for forming the respective layers under the conditions for the formation and measuring the storage modulus for the respective samples.

The organic-inorganic composites may be formed by applying raw material solutions and then heating and drying the solutions. In the case a metal alkoxide having a polymerizable group is used, curing may be carried out by polymerization by heating or radiating light based on the necessity.

In the invention, the lower clad layer may be a substrate having a lower refractive index than that of the core layer.

Also, in the invention, the lower clad layer may be formed on a substrate and further an upper substrate may be installed on the upper clad layer.

In the invention, the upper clad layer may be formed by layering a plurality of layers. In this case, a plurality of the layers may be layers produced from the same material. That is, the upper clad layer may be formed by application separately a plurality of times. Application a plurality times is effective to prevent occurrence of cracking in the upper clad layer or peeling of the upper clad layer.

Further, in the invention, the thickness (t) of the stress moderating layer is in a range defined as the following equation: $0.05\ \mu m \leq t \leq 0.25H$ wherein H denotes the thickness of the core layer and t denotes the thickness of the stress moderating layer. If the thickness of the stress moderating layer is thinner than 0.05 µm, the effect of the invention to suppress the occurrence of cracking and peeling cannot be sufficient in some cases. If the thickness of the stress moderating layer is thicker than 0.25H, light leakage from the stress moderating layer may become significant if it occurs. The thickness of the stress moderating layer is further preferably in a range of $0.1\ \mu m \leq t \leq 10\ \mu m$.

The stress moderating layer is preferably formed from a material having a refractive index not higher (that is equal to or lower) than that of a material for the core layer. Especially, the light leakage from the stress moderating layer can efficiently be prevented by forming the stress moderating layer from a material having a lower refractive index than that of a material for the core layer.

Further, in the invention, the stress moderating layer may be formed from a material same as that of the core layer. Use of the same material as that of the core layer for forming the stress moderating layer makes it possible to form the stress moderating layer simultaneously with the core layer and accordingly simplify the production process. In this case, the stress moderating layer is formed integrally with the core layer.

However, if the stress moderating layer is formed from the same material as that of the core layer, it is probably possible that light leaks to the outside from the stress moderating layer. In such a case, it is preferable to form a groove for separating the core layer and the stress moderating layer in the stress moderating layer and in the vicinity of the core layer and filling the groove with a material with a lower refractive index than that of the material for the stress moderating layer. Formation of such a groove separates the stress moderating layer from the core layer and thus the light leakage from the stress moderating layer can be prevented.

The above-mentioned groove may be formed in the lower clad layer. Further, the groove may be formed penetrating the lower clad layer and reaching the substrate. The adhesion strength between the respectively neighboring layers can be increased by forming the groove so as to penetrate the lower clad layer and reach the substrate in such a manner and filling the groove with a material having good adhesion property to the respective layers.

As the material to fill the groove with, the material same as that of the upper clad layer is preferably used and in the case the material same as that of the upper clad layer, at the time of formation of the upper clad layer, the groove is filled with the material and simultaneously the formation can be carried out.

In the cases the upper substrate is installed on the upper clad layer, the above-mentioned groove may be formed on the upper substrate and the upper clad layer.

As a method for preventing the light leakage from the stress moderating layer, the interface of the stress moderating layer and the upper clad layer may be roughened. Such roughening of the surface-roughened part may be in a range of surface roughness $R_{max}$ from 0.02 to 10 µm.

By making at least one interface of the stress moderating layer with the upper clad layer and the lower clad layer surface-roughened, the UV radiation dose can be made constant at a high precision at the time of photocuring in the case of the upper clad layer or the core layer is cured by UV radiation. That is, in the case the upper clad layer and the core layer of the optical waveguide are formed from photocurable resins, the refractive indexes of the resins are fluctuated depending on the UV radiation dose at the time of curing, so that the UV radiation dose has to be controlled at a high precision. A portion of the UV ray radiated at the time of curing the upper clad layer penetrates also the lower clad layer and the UV ray is reflected in the interface on the opposite to the lower clad layer and again reaches the upper clad layer to contribute to the UV curing of the upper clad layer. In such a manner, the intensity of the reflected UV ray is affected by the unevenness of the refractive index and the thickness of the lower clad layer and is fluctuated and therefore, the refractive indexes of the upper clad layer and the core layer are made uneven.

By making at least one interface of the stress moderating layer with the upper clad layer and the lower clad layer surface-roughened, the UV ray radiated for curing the upper clad layer or the core layer can be reflected by the surface-roughened part so as to prevent the UV ray from reaching the lower clad layer. Accordingly, the UV radiation dose for photocuring the upper clad layer or the core layer can be controlled at a high precision with good reproducibility and dispersion of the refractive indexes of the upper clad layer and the core layer can be narrowed.

The surface-roughening shape of the interface of the stress moderating layer formed for the above-mentioned purpose is not particularly limited if it can scatter the UV ray with wavelength of 400 nm or shorter for photocuring, however it is preferable in a range of surface roughness $R_{max}$ from 0.05 to 10 μm. The surface-roughening shape may include stripe-like shape as shown in FIG. 28, island-like shape as shown in FIG. 29, and randomly formed island-like shape as shown in FIG. 30.

As a method for lessening the occurrence of adverse effects of noise attributed to stray light generated by light leakage from the stress moderating layer, a light absorbing or scattering component may be added to the stress moderating layer. As such a light absorbing or scattering component, carbon particles, oxides such as $TiO_2$ and $ZrO_2$, nitrides such as TiN and ZrN, and the like can be exemplified.

In the invention, the end face of the core layer where light comes in and/or goes out is preferably covered with a protection layer of a transparent material. Formation of such a protection layer can prevent penetration of water in the core layer, pollutant adhesion, and the like.

The protection layer is preferably formed from a material having a refractive index not higher than that of the core layer. In general, the reflection loss may be increased more as the difference of the refractive indexes in the inter face is higher. Accordingly, formation of such a protection layer can lower the loss of light attributed to reflection at the time when the light comes in to the core layer.

The protection layer is preferably formed from the material same as that of the upper clad layer. By forming the protection layer from the material same as that of the upper clad layer, the protection layer and the upper clad layer can be formed simultaneously and the protection layer and the upper clad layer can be formed integrally.

In the invention, the corner parts of the core layer are preferable to have a round shape. By forming the corner parts to be into a round shape, the corner parts of the core layer can be prevented from chipping at the time of core layer formation.

A device for optical communication of the invention employs the above-mentioned optical waveguide of the invention as a medium for transmitting and/or receiving optical signals.

BRIEF DESCRIPTION OF THE DRAWINGS

FIG. 13 is a fabrication process drawing of the example shown in FIG. 11.

FIG. 14 is a cross-sectional view showing also another example of an optical waveguide according to the invention.

DESCRIPTION OF THE PREFERRED EMBODIMENTS

Hereinafter, the invention will be described by way of embodiments, however the description is illustrative of the invention and is not to be construed as limiting the invention. Various modifications and applications may occur to those skilled in the art without departing from the true spirit and scope of the invention as defined by the claims.

Figure 1:
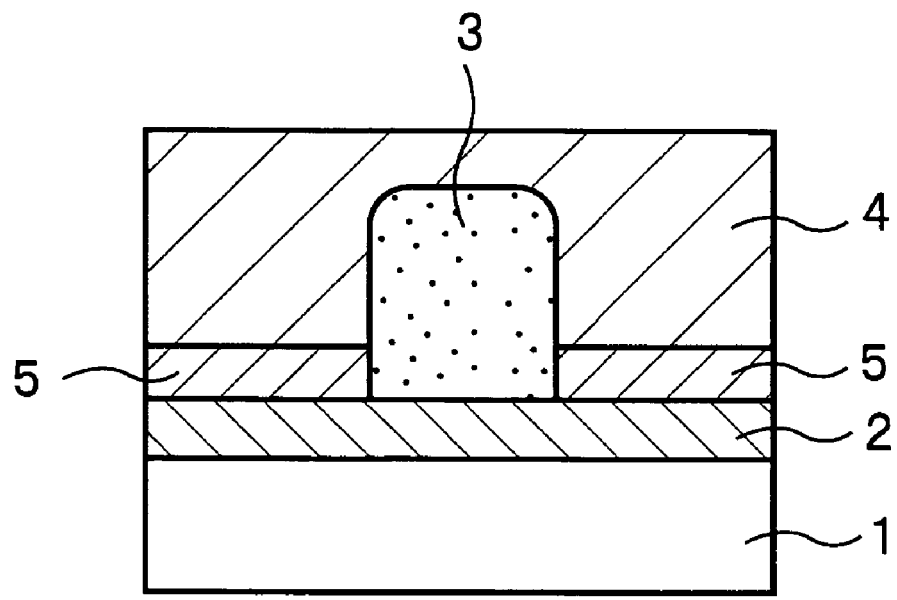
FIG. 1 is a cross-sectional view showing an optical waveguide of one example according to the invention.

FIG. 1 is a cross-sectional view showing one example of an optical waveguide according to the invention. As shown in FIG. 1, a lower clad layer 2 is formed on a substrate 1. On the center part of the lower clad layer 2, a core layer 3 to be a optical transmission region is formed. On the core layer 3, an upper clad layer 4 is formed. The lower clad layer 2 and the upper clad layer 4 are formed from materials having lower refractive indexes than that of the material for the core layer 3. The core layer 3 can transmit light in the inside thereof while being covered with the upper clad layer 4 and the lower clad layer 2.

In the region where the core layer 3 is not formed, a stress moderating layer 5 is formed between the upper clad layer 4 and the lower clad layer 2. The stress moderating layer 5 is formed from a material with a smaller storage modulus than that of the material for the upper clad layer 4. Accordingly, the stress attributed to the volume shrinkage of the upper clad layer 4 caused at the time of forming the upper clad layer 4 can be moderated by the stress moderating layer 5. Consequently, occurrence of cracking and peeling in the lower clad layer 2 as well as occurrence of cracking and peeling in the upper clad layer 4 can efficiently be prevented.

The thickness of the stress moderating layer 5 is preferably 0.05 μm or thicker and ¼ or less of that of the core layer 3. It is further preferably in a range of 0.1 μm to 10 μm.

In the invention, the lower clad layer 2, the core layer 3, the upper clad layer 4, and the stress moderating layer 5 are all produced from organic-inorganic composites. The substrate 1 is a glass substrate.

Figure 2:
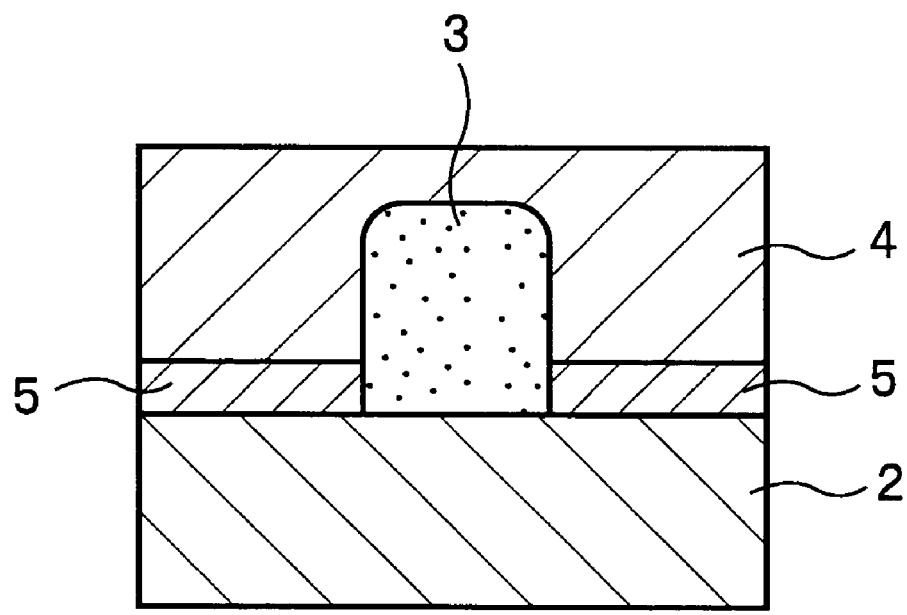
FIG. 2 is a cross-sectional view showing another example of an optical waveguide according to the invention.

FIG. 2 is a cross-sectional view showing another example of an optical waveguide according to the invention. In the embodiment shown in FIG. 2, the substrate has a lower refractive index than that of the core layer 3 and the substrate composes the lower clad layer 2. As the substrate usable as the lower clad layer 2 just like this, for example,. quartz, Tempax glass, Pyrex (trade name) glass and the like can be exemplified.

Figure 3:
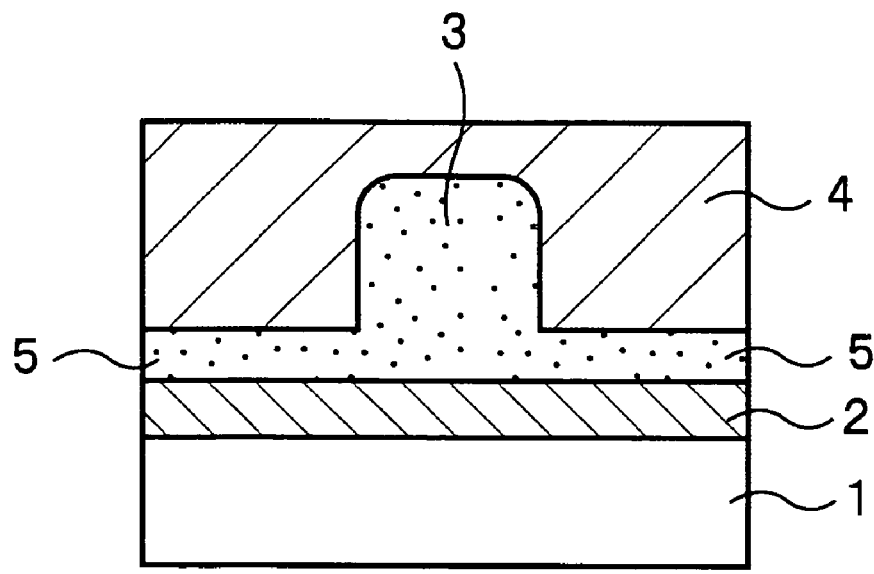
FIG. 3 is a cross-sectional view showing also another example of an optical waveguide according to the invention.

FIG. 3 is a cross-sectional view showing also another example of an optical waveguide according to the invention. In this embodiment, the stress moderating layer 5 is formed from the same material as that for the core layer 3. Accordingly, the stress moderating layer 5 and the core layer 3 are formed integrally.

The stress moderating layer 5 is formed from a material with a smaller storage modulus than that of the material for the upper clad layer. However, since it is formed form the same material as that for the core layer 3, the refractive index of the stress moderating layer 5 is same as that of the core layer 3.

In this embodiment, since the stress moderating layer 5 and the core layer 3 are formed from the same material, at the time of forming the core layer 3, the stress moderating layer 5 can be formed simultaneously. Accordingly, the fabrication process can be simplified. However, since the material is the same as that for the core layer 3, the refractive indexes of both layers are same and the light transmitted through the core layer 3 possibly leaks to the outside through the stress moderating layer 5. Such light leakage can be suppressed by various methods which will be described later.

Figure 4:
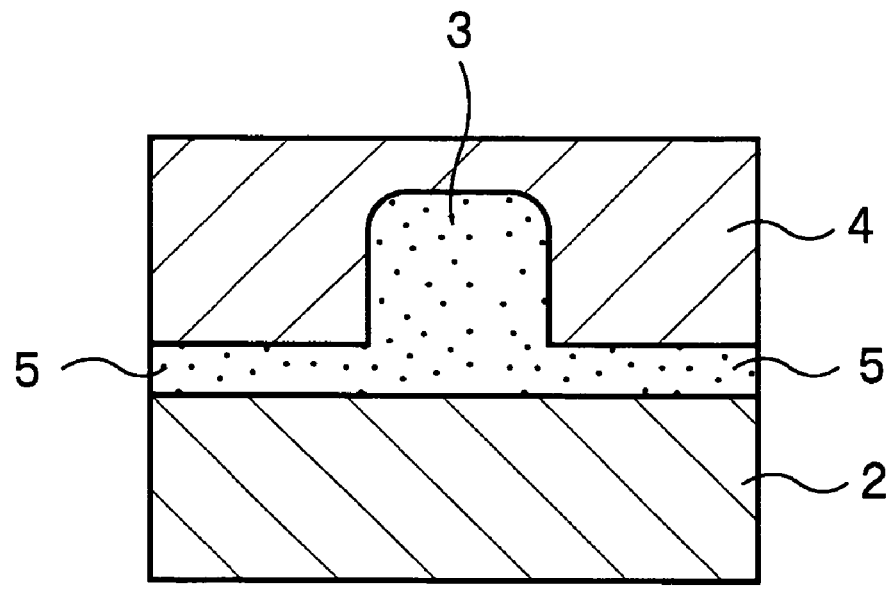
FIG. 4 is a cross-sectional view showing also another example of an optical waveguide according to the invention.
Figure 5A:
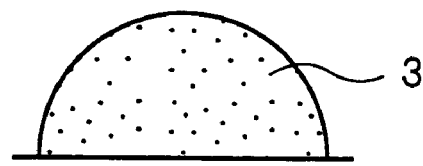
FIG. 5 is an illustration showing a cross-sectional view of a core layer in the invention.
Figure 5B:
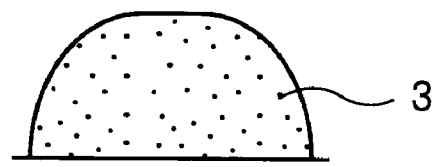
Figure 5C:
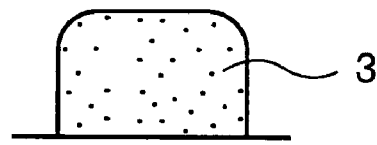
Figure 5D:
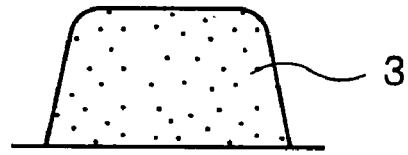
Figure 5E:
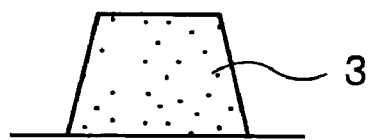
Figure 5F:
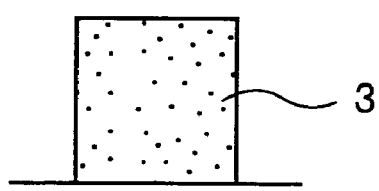

FIG. 4 is a cross-sectional view showing also another example of an optical waveguide according to the invention. In the embodiment shown in FIG. 4, the lower clad layer 2 is formed from the substrate. Others are same as described in the embodiment shown in FIG. 3.

FIG. 5 is an illustration showing a cross-sectional view of a core layer in the invention. The core layer 3 shown in FIG. 5(a) to 5(d), has no corner part or has corner parts having a rounded shape. Therefore, chipping is hardly caused at the time of forming the core layer.

FIG. 6 and FIG. 7 are cross-sectional views illustrating a fabrication process of the embodiment shown in FIG. 3.

Figure 6A:
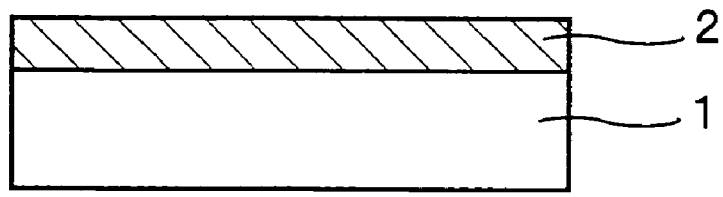
FIG. 6 is a fabrication process drawing of the example shown in FIG. 3.

As shown in FIG. 6(a), the lower clad layer 2 of an organic-inorganic composite is formed on the glass substrate 1.

Figure 6B:
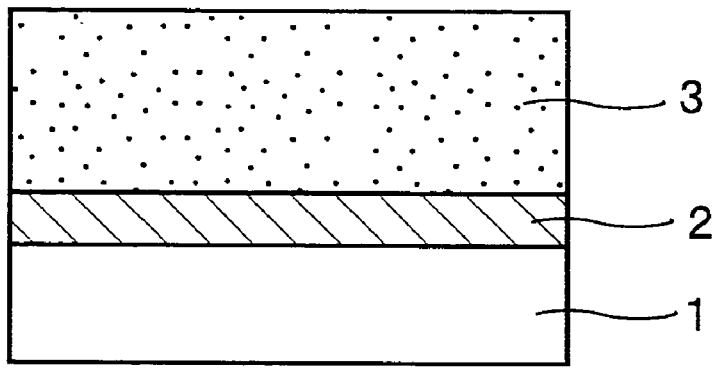
Figure 6C:
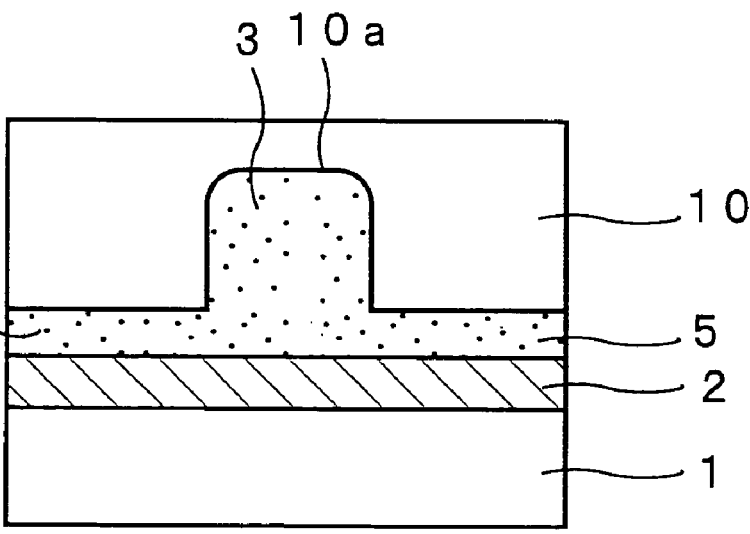

Next, as shown in FIG. 6(b), the core layer 3 of an organic-inorganic composite is formed on the lower clad layer 2. As the organic-inorganic composite of the core layer 3, a thermoplastic organic-inorganic composite is formed. Such a thermoplastic organic-inorganic composite can be formed from, for example, a solution containing a thermoplastic resin and a metal alkoxide. The core layer 3 is heated to be in softened state, and then as shown in FIG. 6(c), a mold 10 is pressed on the softened core layer 3. The mold 10 has a recessed part 10a and the core layer 3 is formed corresponding to the shape of the recessed part 10a. In the peripheral part of the recessed part 10a, the stress moderating layer 5 is formed. The mold 10 in this embodiment is made of glass.

Figure 7D:
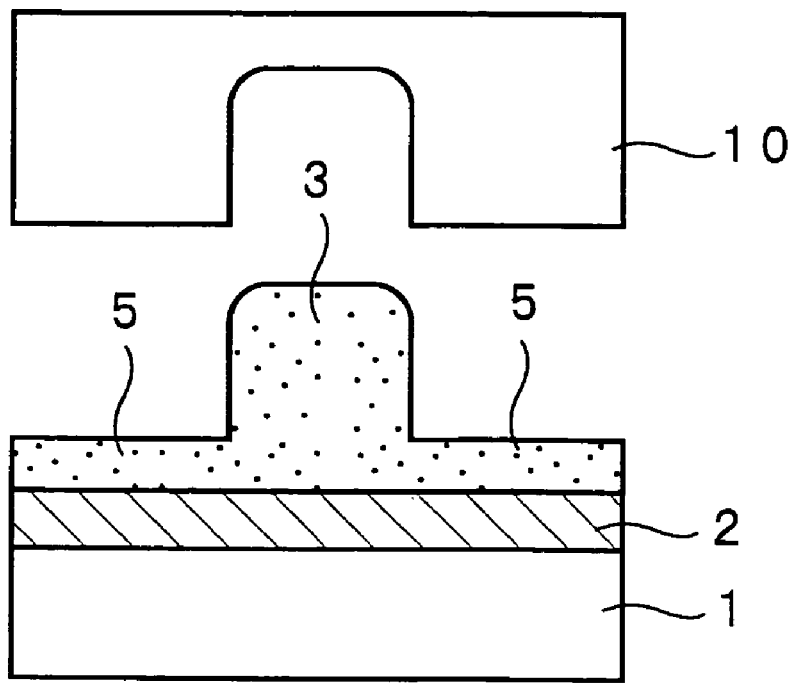
FIG. 7 is a fabrication process drawing of the example shown in FIG. 3.
Figure 7E:
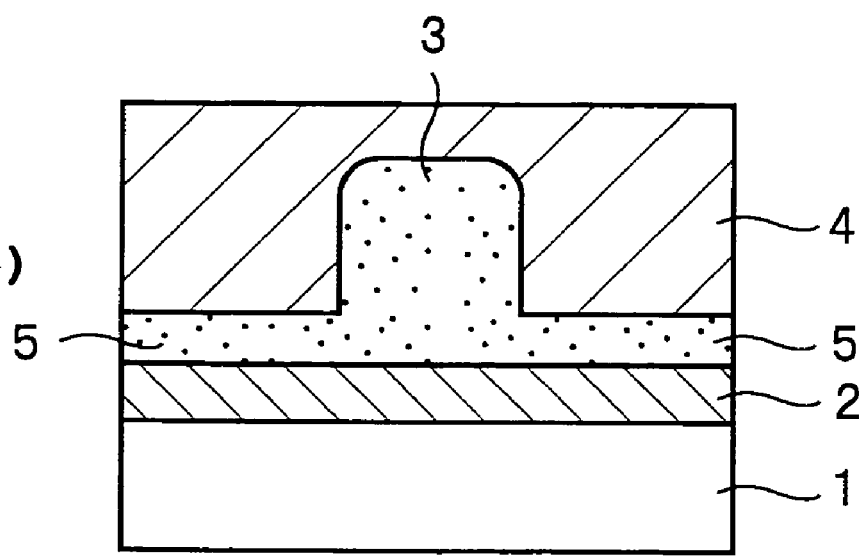

Next, as illustrated in FIG. 7(d), the mold 10 is taken out and as illustrated in FIG. 7(e), the upper clad layer 4 of an organic-inorganic composite is formed on the core layer 3 and the stress moderating layer 5.

Figure 8:
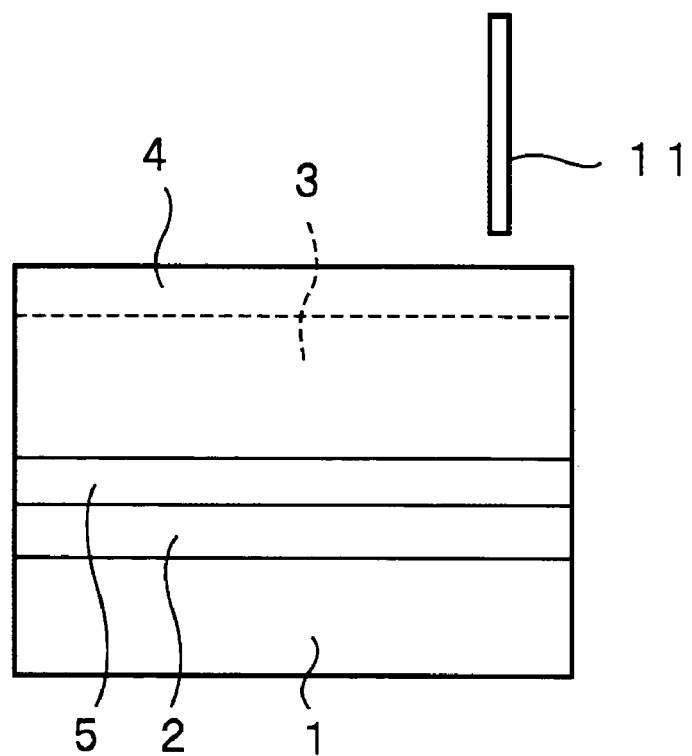
FIG. 8 is a fabrication process drawing of the example shown in FIG. 3.

FIG. 8 is a side view showing the state of cutting the end part of an optical waveguide fabricated as described above. As shown in FIG. 8, the end part of the optical waveguide is cut by a dicing saw 11 to expose a good end face.

Figure 9:
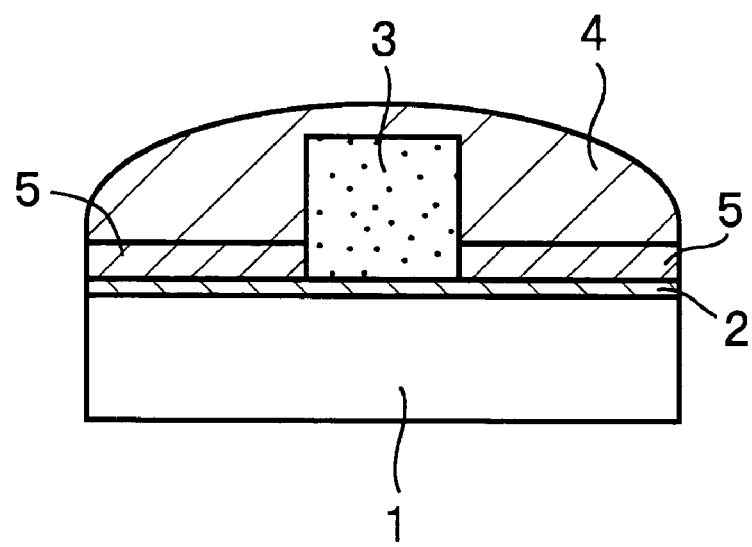
FIG. 9 is a cross-sectional view showing also another example of an optical waveguide according to the invention.

FIG. 9 is a cross-sectional view showing also another example of an optical waveguide according to the invention.

The embodiment shown in FIG. 9, as same as the embodiment shown in FIG. 1, the lower clad layer 2 is formed on the substrate 1 and the stress moderating layer 5 is formed from a material different from that for the core layer 3.

FIG. 10 is a cross-sectional view showing the fabrication process of the embodiment shown in FIG. 9.

Figure 10A:
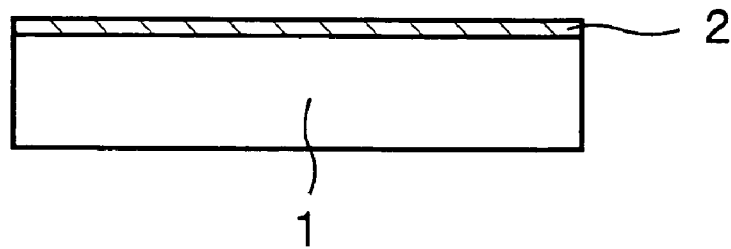
FIG. 10 is a fabrication process drawing of the example shown in FIG. 9.
Figure 10B:
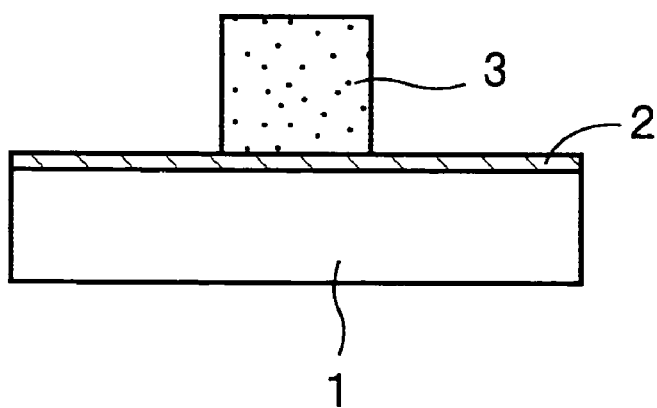

As shown in FIG. 10(a), the lower clad layer 2 is formed on the substrate 1. Next, as shown in FIG. 10(b), the core layer 3 is formed on the lower clad layer 2. The core layer 3 is formed by forming the core layer 3 on the entire face of the lower clad layer 2 and then patterning as shown in FIG. 10(b) by photolithography and etching.

Figure 10C:
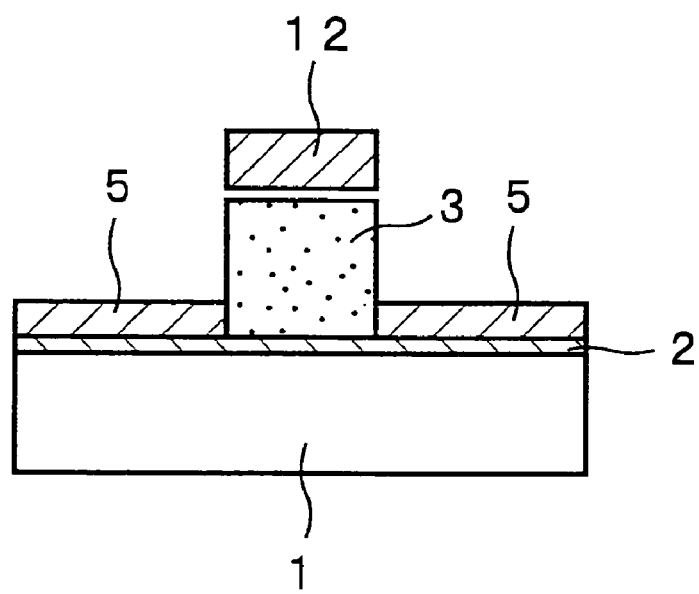

Next, as shown in FIG. 10(c), a mask 12 is then formed on the core layer 3 and the stress moderating layer 5 is formed on the region other than the core layer. After the mask 12 is removed, the upper clad layer is formed on the stress moderating layer 5 and the core layer 3 so as to obtain the optical waveguide as shown in FIG. 9.

Figure 11:
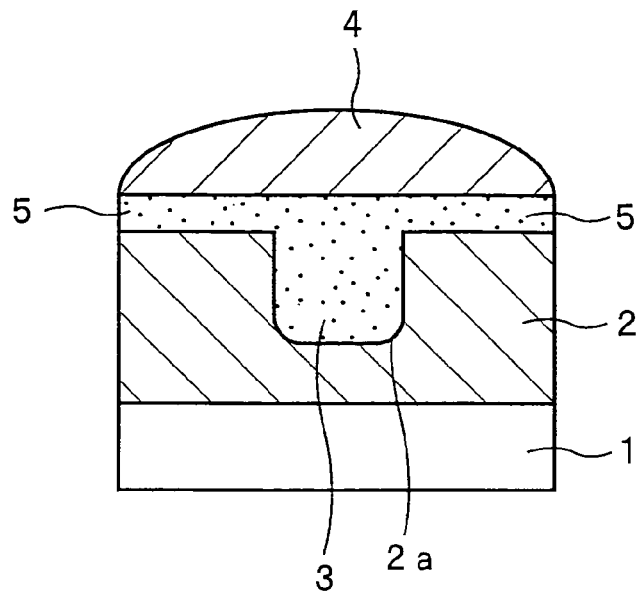
FIG. 11 is a cross-sectional view showing also another example of an optical waveguide according to the invention.
Figure 11:
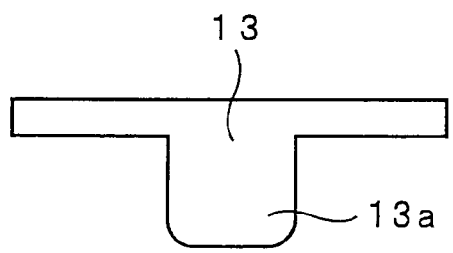

FIG. 11 is a cross-sectional view showing also another example of an optical waveguide according to the invention. In the embodiment shown in FIG. 11, a recessed part 2a is formed in the lower clad layer 2 and the core layer 3 is formed in the recessed part 2a. The stress moderating layer 5 is formed from the same material as that for the core layer 3.

FIG. 12 and FIG. 13 show fabrication process drawings of the embodiment shown in FIG. 11.

Figure 12A:
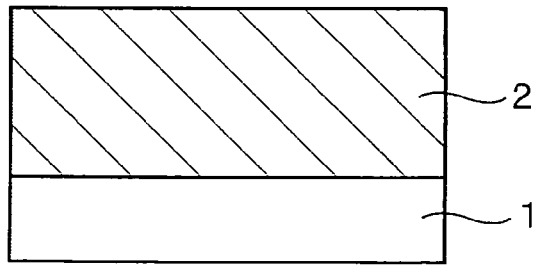
FIG. 12 is a fabrication process drawing of the example shown in FIG. 11.

As shown in FIG. 12(a), the lower clad layer 2 is formed on the substrate 1. The lower clad layer 2 is formed from a thermoplastic organic-inorganic composite. The lower clad layer 2 is softened by heating and a mold 13 having a projected part 13a projected downward is pressed to the softened lower clad layer 2.

Figure 12B:
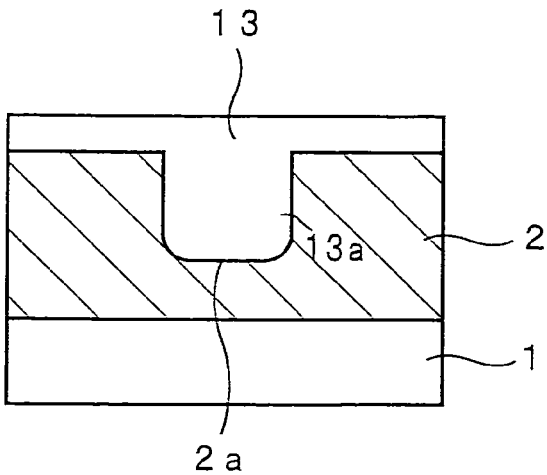

As shown in FIG. 12(b), the recessed part 2a is formed in the lower clad layer 2 by the projected part 13a of the mold 13.

Next, as shown in FIG. 13(c), the mold 13 is taken out and as shown in FIG. 13(d), the core layer 3 is formed on the lower clad layer 2. While being embedded in the recessed part 2a, the core layer 3 is formed and the stress moderating layer 5 is formed in the peripheral region.

Next, the upper clad layer is formed on the stress moderating layer 5 and the core layer 3 to obtain the optical waveguide of the embodiment shown in FIG. 11.

The solutions to be used for the following Examples for forming the respective organic-inorganic composites are as follows.

[Solution for Forming Clad Layer]

3-Methacryloxypropyltriethoxysilane (MPTES) 13.2 g, ethanol 16.8 g, hydrochloric acid (2N) 1.6 g, and phenyltriethoxysilane (PhTES) 2.4 g were mixed and kept at 30° C for 45 hours to obtain a solution A. The solution A was used for forming the lower clad layer and an upper clad layer.

[Solution for Forming Core Layer (Stress Moderating Layer)]

PhTES 39.6 g, hydrochloric acid (0.05N) 5.9 g, and N-methyl-2-pyrrolidone (NMP) 53.6 g were mixed and kept at 30° C. for 19 hours. The obtained solution 19.1 g and 10.9 g of a solution obtained by dissolving poly(methyl methacrylate) (PMMA) 17.5 g in NMP 82.5 g were mixed for 30 minutes to obtain a solution B. The core layer and the stress moderating layer (in the case of forming with the same material as that of the core layer) were formed by using the solution B.

[Solution for Forming Stress Moderating Layer]

PhTES 39.6 g, hydrochloric acid (0.05N) 5.9 g, and NMP 53.6 g were mixed and kept at 30° C. for 19 hours to obtain a solution. The obtained solution 3.3 g and 16.7 g of a solution obtained by dissolving PMMA 17.5 g in NMP 82.5 g were mixed for 30 minutes to obtain a solution C. The stress moderating layer was formed by using the solution C.

The refractive indexes and the storage moduli of the organic-inorganic composites produced from above-mentioned solutions A, B, and C are as follows.

Solution A: the refractive index about 1.50; the storage modulus about 27,000 kgf/cm$^2$.

Solution B: the refractive index about 1.54; the storage modulus about 22,000 kgf/cm$^2$.

Solution C: the refractive index about 1.50; the storage modulus about 20,000 kgf/cm$^2$.

EXAMPLE 1

An optical waveguide as an example shown in FIG. 3 was fabricated as follows.

As illustrated in FIG. 6(a), the solution A was applied to a glass substrate 1 with a diameter of 76 mm and a thickness of 1 mm by spin coating and after the application, the substrate was heated at 180° C. for 20 minutes by a heating furnace to cure the applied film and form a lower clad layer 2 with about 5 μm thickness. By the above-mentioned heating, the methacryloxy groups of MPTES were polymerized.

Next, as shown in FIG. 6(b), the solution B was dropwise added on the lower clad layer 2 and dried at 120° C. for 5 hours to remove the solvent and form a core layer 3 with about 50 μm thickness.

Next, the core layer 3 was softened by heating to 140° C. and then as shown in FIG. 6(c), a mold 10 made of glass was pressed to transfer the shape of the mold 10 to the core layer 3. The recess part 10a of the mold 10 had a width of 100 μm, a depth of 40 μm, and a radius curvature of the corner parts of 10 μm.

In such a manner, the core layer 3 and the stress moderating layer 5 were simultaneously formed. The thickness of the stress moderating layer 5 was about 10 μm and the thickness of the core layer 3 was about 50 μm.

Next, as shown in FIG. 7(d), after the mold 10 was taken out, an upper clad layer 4 (the thickness from the top face of the stress moderating layer 5 to the top face of the upper clad layer 4; about 60 μm) was formed as shown in FIG. 7(e). The upper clad layer 4 was formed by heating the solution A at 120° C. for 20 minutes for removing the solvent (ethanol) and obtaining a solution with a high viscosity; dropwise titrating the obtained solution to the core layer 3 and the stress moderating layer 5; and then radiating UV rays with center wavelength of 365 nm in an intensity of 200 mW/cm$^2$ (distance 10 mm) for about 30 minutes by a UV radiation apparatus.

At the time of forming the upper clad layer 4, the formation was repeated twice. That is, at first a half of the needed amount for the upper clad layer 4 was applied and then UV radiation was carried out and the remaining solution was applied thereto and again UV radiation was carried out for curing. Occurrence of cracking and peeling of the upper clad layer can be prevented by forming the upper clad layer by repeating the formation steps a plurality of times in such a manner. Incidentally, in the following Examples, the upper clad layer was formed similarly by repeating the formation twice.

With respect to the organic-inorganic composites of the lower clad layer 2 and the upper clad layer 4, the methacryloxy groups of MPTES were polymerized. In the lower clad layer 2, polymerization was carried out by heat and in the upper clad layer 4, polymerization was carried out by UV radiation.

The reason for the curing of the upper clad layer 4 by UV radiation is because if heating was employed for the polymerization, the core layer 3 and the stress moderating layer 5 were probably deformed owing to the thermoplasticity of the core layer 3 and the stress moderating layer 5. Accordingly, in order to avoid deformation of the core layer 3 and the stress moderating layer 5 by heat, the upper clad layer was cured by UV radiation.

[Evaluation of Stress Moderating Effect]

To evaluate the stress moderating effect of the stress moderating layer, a lower clad layer (a thickness: about 5 μm) was formed on a glass substrate from the solution A and thereon, a stress moderating layer (a thickness: about 10 μm) was formed from the solution B, and further thereon an upper clad layer (a thickness: about 60 μm) was formed from the solution A to obtain a sample. Fifty pieces of such a sample were produced and subjected to observation by an optical microscope to find that peeling of the upper clad layer and the lower clad layer took place in 3 pieces.

On the other hand, for comparison, a sample was produced by forming a lower clad layer and an upper clad layer on a substrate. In this sample, no stress moderating layer was formed between the upper clad layer and the lower clad layer. Fifty pieces of such a sample were produced and subjected to observation by an optical microscope to find that peeling of the upper clad layer and the lower clad layer took place in 11 pieces.

From the above-mentioned results, it can be understood that formation of the stress moderating layer between the upper clad layer and the lower clad layer can moderate the stress at the time of the upper clad layer formation and prevent occurrence of cracking and peeling.

[Evaluation of Water-Proofness]

In the same manner as described above, 50 pieces of the same sample comprising the stress moderating layer between the upper clad layer and the lower clad layer were produced and these pieces were immersed in water at 23° C. for 24 hours. As a result, occurrence of peeling of the upper clad layer and the lower clad layer was observed in 5 pieces. On the other hand, 50 pieces of a comparative sample comprising no stress moderating layer as described above were produced and subjected to the same water-proofness test to find that peeling of the upper clad layer and the lower clad layer took place in 20 pieces.

Accordingly, it was found that formation of the stress moderating layer between the upper clad layer and the lower clad layer improved the water-proofness.

EXAMPLE 2

An optical waveguide as an example shown in FIG. 9 was fabricated as follows.

As illustrated in FIG. 10(*a*), the solution A was applied to a glass substrate 1 with a diameter of 76 mm and a thickness of 1 mm by spin coating and then the substrate was heated at 180° C. for 20 minutes by a heating furnace to form a lower clad layer 2 with about 2 μm thickness.

Next, the solution B was dropwise added on the lower clad layer 2 and dried at 120° C. for 5 hours to remove the solvent and form a core layer 3 with about 50 μm thickness. Patterning of the core layer 3 was carried out by a photolithographic method and an etching method to form the core layer 3 with a shape shown in FIG. 10(*b*).

Next, as shown in FIG. 10(*c*), a mask 12 was put on the core layer 3 and the solution C was dropwise added and dried at 120° C. for 5 hours to form a stress moderating layer 5 with about 10 μm thickness.

After that, the mask 12 was taken off, in the same manner as the above-mentioned Example 1, the solution with an increased viscosity obtained by removing the solvent from the solution A was applied and then UV radiation was carried out for about 30 minutes to form an upper clad layer 4 (a thickness: about 60 μm).

[Evaluation of Stress Moderating Effect]

In the same manner as the above-mentioned Example 1, 50 pieces of a sample were produced by forming the lower clad layer, the stress moderating layer, and the upper clad layer on a substrate in this order. Incidentally, the stress moderating layer was formed from the solution C. As a result of observation by an optical microscope in the same manner as Example 1, peeling of the upper clad layer and the lower clad layer was observed in two pieces of the sample.

[Evaluation of Water-Proofness]

With respect to 50 pieces of the above-mentioned same sample, the water-proofness test was carried out in the same manner as the above-mentioned Example 1, peeling was observed in 17 pieces.

From the above-mentioned results, similarly to Example 1, also in this Example, it was understood that formation of the stress moderating layer moderated the stress at the time of upper clad layer formation and suppressed occurrence of peeling. Further, water-proofness was also found improved.

EXAMPLE 3

An optical waveguide as an example shown in FIG. 11 was fabricated as follows.

As illustrated in FIG. 12(*a*), the solution A was dropwise added to a glass substrate 1 with a diameter of 76 mm and a thickness of 1 mm and then while a mold 13 made of glass being pressed, the substrate was heated at 180° C. for 20 minutes by a heating furnace to cure and form a lower clad layer 2. A projected part 13*a* was formed in the mold 13 and the projected part 13*a* had a width of 100 μm, a height of 40 μm, and a radius curvature of the corner parts of 10 μm.

As illustrated in FIG. 13(*c*), the mold 13 was taken off to form a lower clad layer 2 having a recessed part 2*a*. The thickness of the lower clad layer 2 was about 70 μm.

Next, the solution B was dropwise added on the lower clad layer 2 and dried at 120° C. for 5 hours to evaporate the solvent and carry out curing. Thereby, a core layer 3 was formed in the recessed part 2*a* and a stress moderating layer 5 was formed in its peripheral part.

After that, the solution A was dropwise added thereon and then UV radiation was carried out for 30 minutes to form an upper clad layer 4 (a thickness: about 30 μm).

EXAMPLE 4

FIG. 14 is a cross-sectional view showing another example of an optical waveguide according to the invention. In this Example, the interface 5*a* between a stress moderating layer 5 and an upper clad layer 4 was roughened. By making the surface-roughened part 5*a* roughened as described above, light rays from a core layer 4 were prevented from passing through the stress moderating layer 5 and leaking to the outside. The surface-roughened part 5*a* was roughened to the extent equivalent to the surface roughness $R_{max}$ about 1 μm.

Figure 15A:
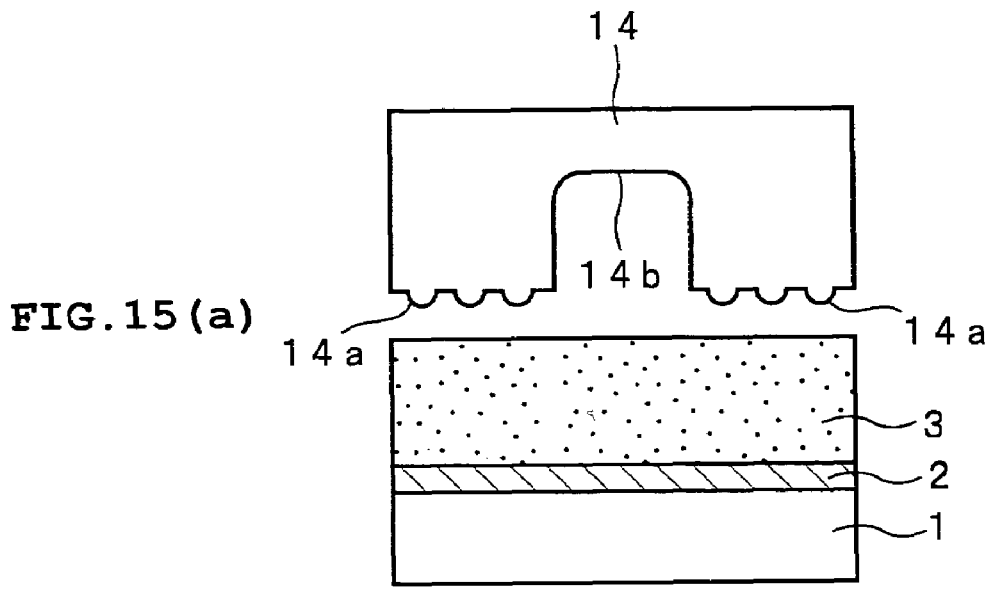
FIG. 15 is a fabrication process drawing of the example shown in FIG. 14.
Figure 15B:
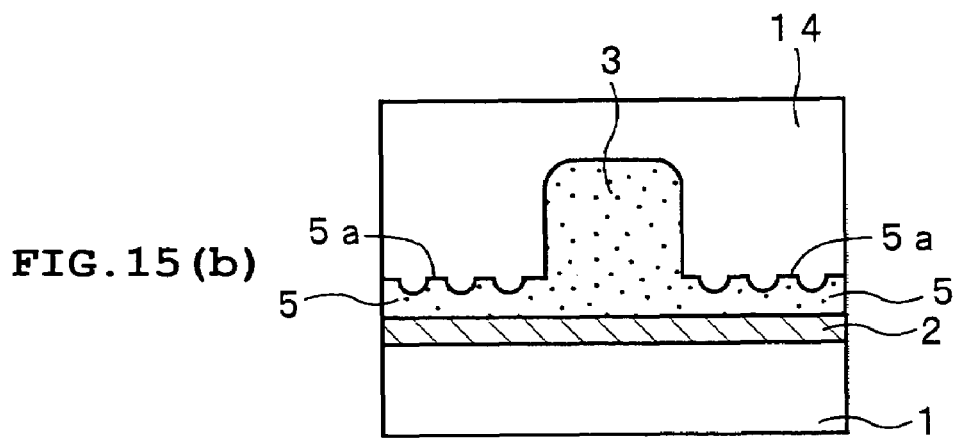
Figure 15C:
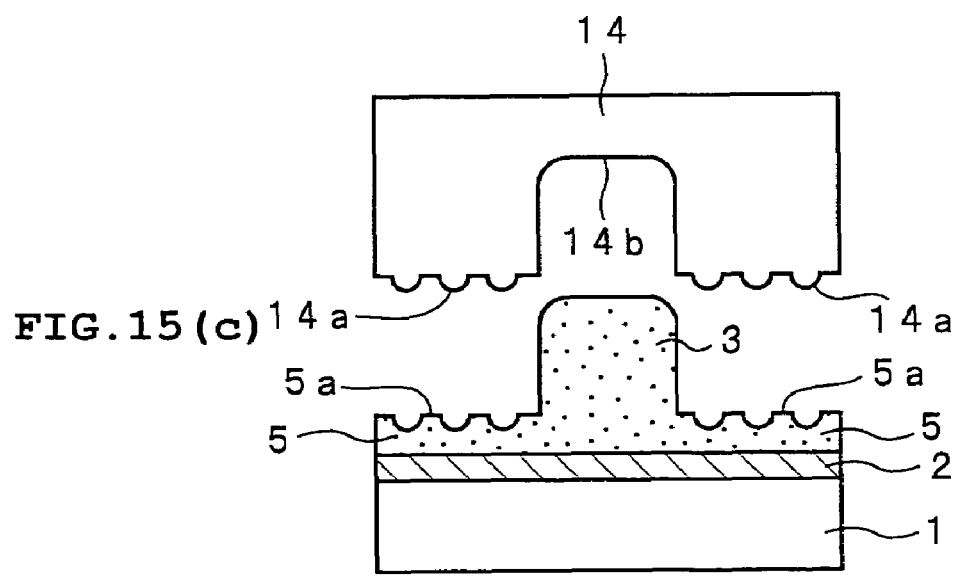

As shown in FIG. 15(*a*), in the same manner as Example 1, a lower clad layer 2 and the core layer 3 were formed on a substrate 1. A mold 14 having a surface-roughened part 14*a* in a region corresponding to the stress moderating layer and a recessed part 14*b* in a region corresponding to the core layer was pressed to the core layer 3 as shown in FIG. 15(*b*). The roughening of surface-roughened part 14*a* was equivalent to the surface roughness $R_{max}$ about 1 μm and the surface-roughened part was transferred to the surface of the stress moderating layer 5.

As shown in FIG. 15(*c*), the mold 14 was taken off, the surface-roughened part 5*a* was formed on the surface of the stress moderating layer 5. Next, in the same manner as Example 1, the upper clad layer was formed to obtain an optical waveguide shown in FIG. 14.

Figure 18:
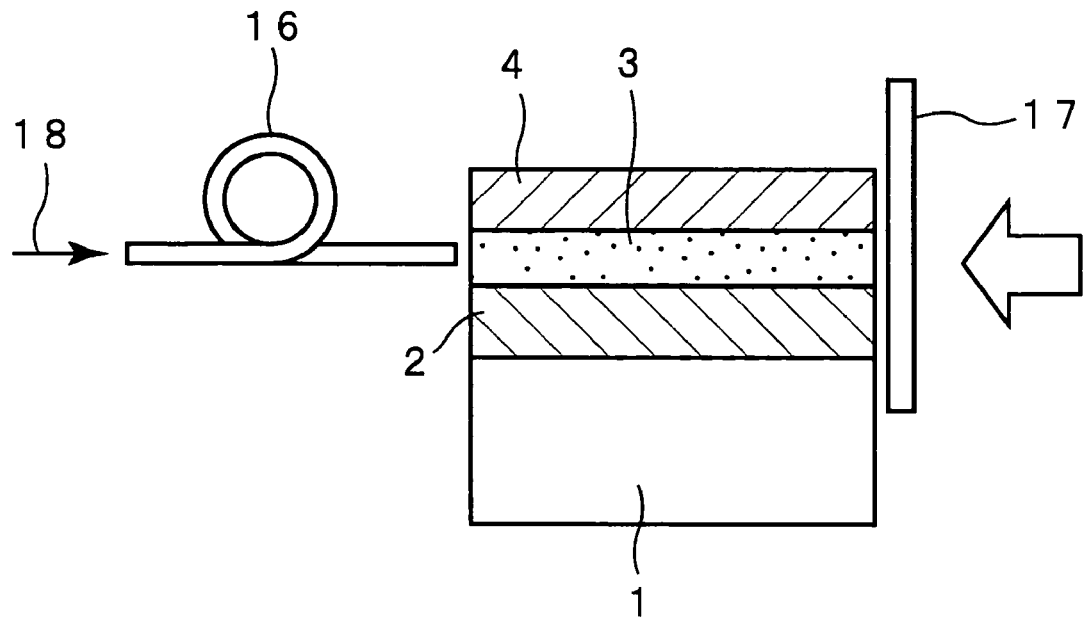
FIG. 18 is a schematic drawing of an apparatus for carrying out a optical transmission test for an optical waveguide of the example in the invention.

The light leakage in the produced optical waveguide was evaluated by using an apparatus illustrated in FIG. 18. In the apparatus illustrated in FIG. 18, an optical fiber with a core diameter about 7 μm was installed and laser beam 18 with wavelength of 650 nm was introduced into one end face and the core layer 3 of the optical waveguide was positioned at the other end face. The laser beam entering in one end face of the core layer 3 passed through the core layer 3 and came out of the other end face and impinged upon a screen 17. The light spot formed by impingement upon the screen 17 was observed from the direction shown as an arrow to observe the light leakage state. As a result, with respect to the optical waveguide of the Example, a sharp light spot corresponding to the core layer 3 was observed. On the other hand, in the case of using the optical waveguide of Example 1, dim light was observed in the surrounding of the light spot. Accordingly, in the case of Example 1, it was understood that light leakage from the stress moderating layer took place.

In this Example, it can be assumed that the light leaking to the stress moderating layer was diffused to the upper side of the optical waveguide by the roughened interface of the stress moderating layer and the upper clad layer and therefore did not reach the screen.

EXAMPLE 5

Figure 16:
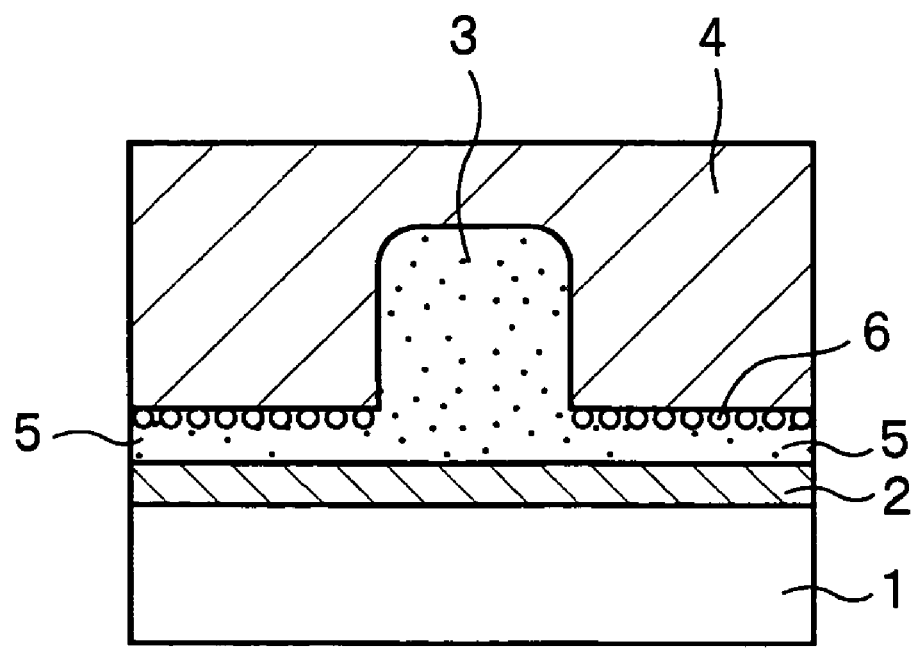
FIG. 16 is a cross-sectional view showing also another example of an optical waveguide according to the invention.

FIG. 16 is a cross-sectional view showing another example of an optical waveguide according to the invention. In this Example, carbon particles 6 as a light absorbing component are added in the interface of the stress moderating layer 5 and the upper clad layer 4.

FIG. 17 is a cross-sectional view showing the fabrication process of the embodiment shown in FIG. 16.

Figure 17A:
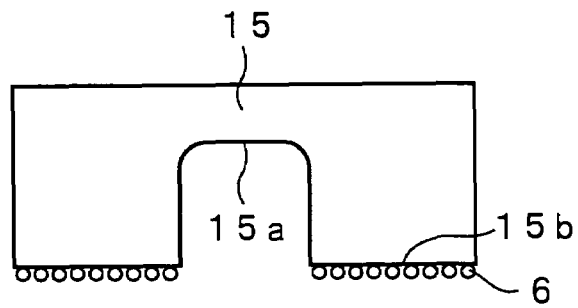
FIG. 17 is a fabrication process drawing of the example shown in FIG. 16.
Figure 17B:
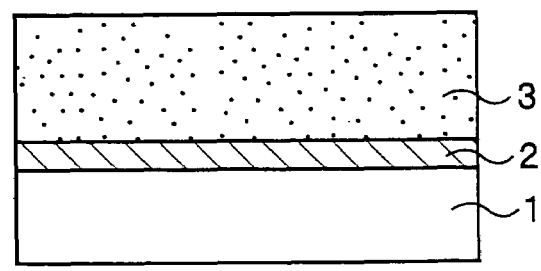

As shown in FIG. 17(a), carbon particles 6 were stuck to the tip end face 15b of a mold 15 which was a part corresponding to the stress moderating layer and the mold 15 was pressed to the core layer 3 as shown in FIG. 17(b). Accordingly, the carbon particles 6 are placed in the stress moderating layer 5. Also, a core layer 3 was formed in the region corresponding to the recessed part 15a of the mold 15.

Figure 17C:
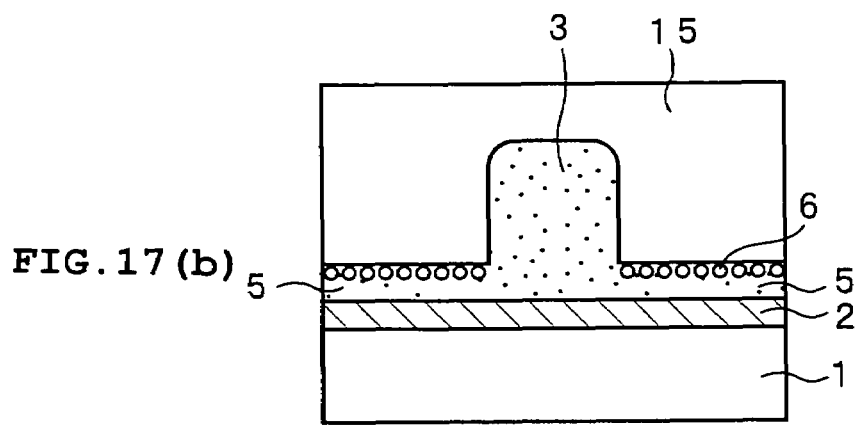

As shown in FIG. 17(c), the mold 15 was took off so as to add the carbon particles 6 to the surface of the stress moderating layer 5. Next, an upper clad layer 4 was formed on the core layer 3 and the stress moderating layer 5 to obtain an optical waveguide of the embodiment shown in FIG. 16.

In this Example, carbon powder with an average particle diameter of about 1 μm was used as the carbon particles 6.

In the same manner as Example 4, light leakage of the optical waveguide obtained in this Example was evaluated by using the apparatus shown in FIG. 18 to find that a sharp light spot was formed on the screen and same as Example 4, light leakage from the stress moderating layer was surely prevented. It is supposedly attributed to that the light leaking to the stress moderating layer was scattered or absorbed by the carbon particles added to the stress moderating layer and accordingly prevented from reaching the screen.

EXAMPLE 6

Optical waveguides were produced in the same manner as Example 1, except that the thickness of the stress moderating layer was changed to be 0.02 μm, 0.05 μm, 0.1 μm, 0.3 μm, and 10 μm. Fifty pieces of the respective optical waveguide samples were produced and observed by an optical microscope to find that peeling of the respective upper clad layers and lower clad layers occurred in 18 pieces having 0.02 μm thickness of the stress moderating layers; in 10 pieces having 0.05 μm thickness; in 4 pieces having 0.1 μm thickness; in 3 pieces having 0.3 μm, and in 3 pieces having 10 μm.

From the above-mentioned results, it can be understood that the thickness of the stress moderating layer is preferably 0.05 μm or thicker and more preferably 0.1 μm or thicker.

It was also found that in the case the height of the core layer was 40 μm, if the thickness of the stress moderating layer was 10 μm or thicker, during the transmission of light in the core layer with a distance of 20 mm, 50% or more light was transmitted through the stress moderating layer and consequently leaked. Similarly, in the case the height of the core layer was 80 μm, if the thickness of the stress moderating layer was 20 μm or thicker, 50% or more light leaked.

According to the findings, it can be understood that the thickness (t) of the stress moderating layer is preferably in a range defined as 0.05 μm≦t≦0.25H wherein H denotes the height H of the core layer, more preferably 0.1 μm≦t≦10 μm.

EXAMPLE 7

Figure 19:
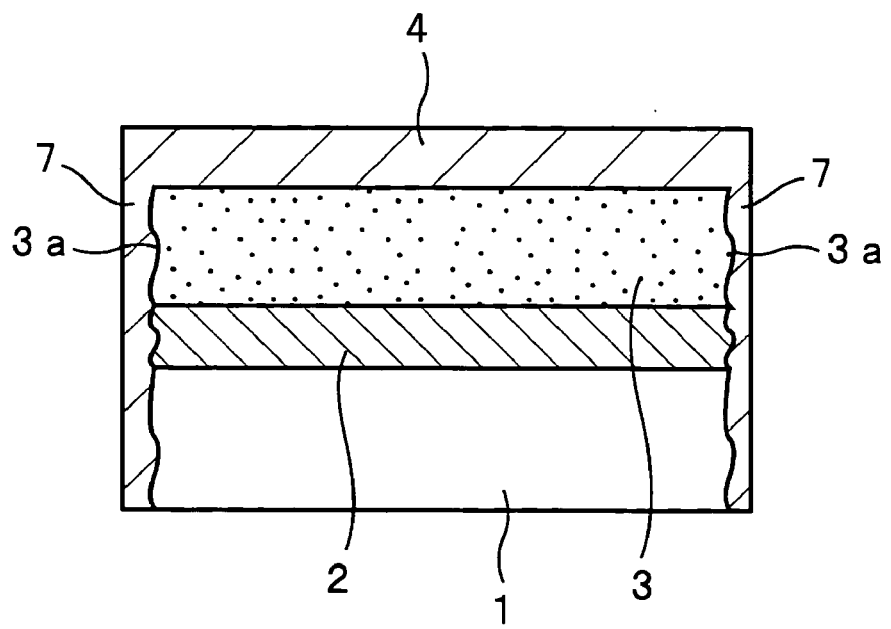
FIG. 19 is a side cross-sectional view showing another example of an optical waveguide according to the invention.

FIG. 19 is a cross-sectional side view of another example of an optical waveguide according to the invention. As shown in FIG. 19, a protection layer 7 was formed on the end face 3a of a core layer 3 where light comes in and/or comes out. The protection layer 7 was formed from the material same for an upper clad layer 4. Accordingly, the protection layer 7 and the upper clad layer 4 were formed integrally.

Figure 20:
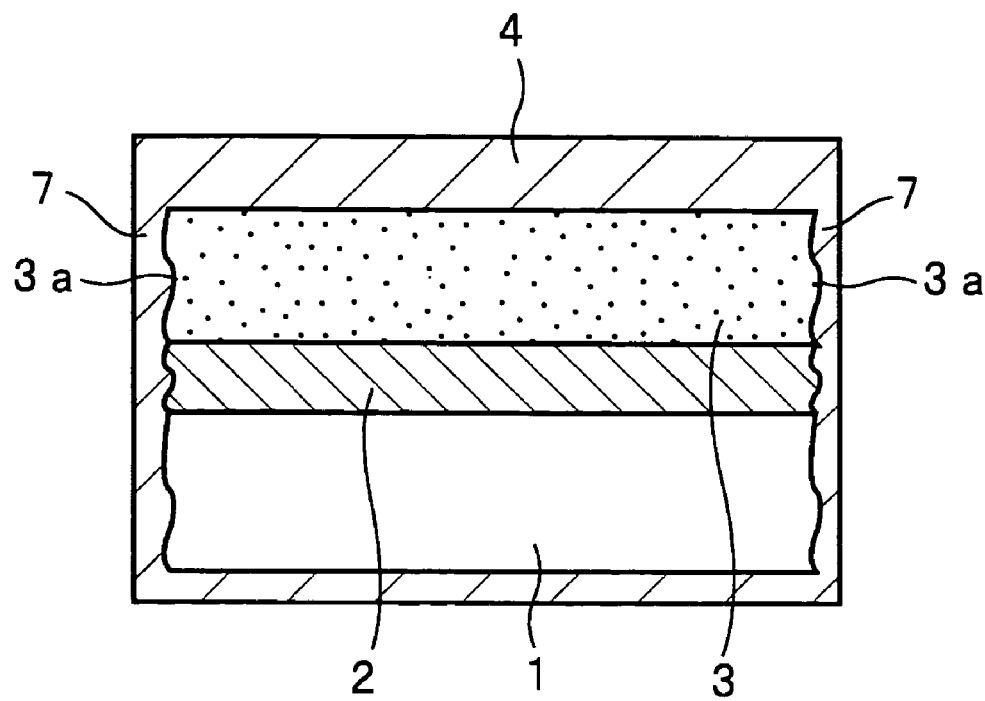
FIG. 20 is a side cross-sectional view showing also another example of an optical waveguide according to the invention.

As same as the embodiment shown in FIG. 19, in the embodiment shown in FIG. 20, the protection layer 7 was formed on the end face 3a of the core layer 3. In the embodiment shown in FIG. 20, the protection layer 7 was formed in the lower side of a substrate 1.

In the embodiments shown in FIG. 19 and FIG. 20, the thickness of the protection layer 7 was about 50 μm. The light output was increased by 3% by covering the end face 3a with the protection layer 7.

It was assumed that formation of the protection layer 7 was effective to prevent water penetration in the core layer or adhesion of polluting substance to the layer and thereby, the light output capability was improved.

EXAMPLE 8

Figure 21:
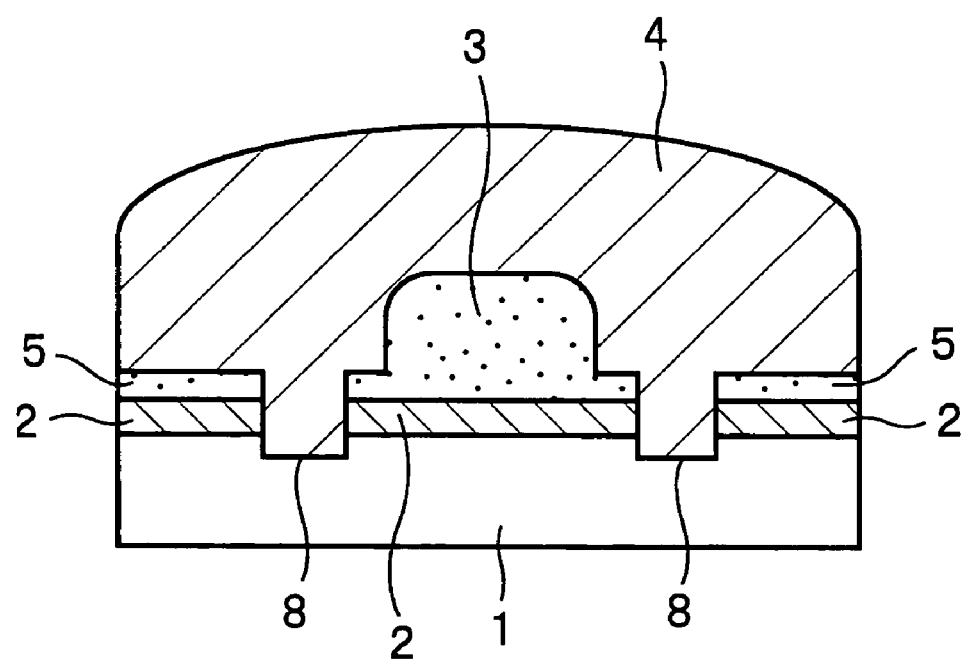
FIG. 21 is a cross-sectional view showing also another example of an optical waveguide according to the invention.

FIG. 21 is a cross-sectional view showing another example of an optical waveguide according to the invention. In the embodiment shown in FIG. 21, a groove 8 for separating a core layer and a stress moderating layer 5 was formed in the stress moderating layer in the vicinity of the core layer 3. The groove 8 was filled with the same material as that for an upper clad layer 4. Accordingly, a material having a lower refractive index than that of the stress moderating layer 5 was packed in the groove 8. Therefore, the light transmitted through the core layer 3 was reflected by the material in the groove 8. As a result, the light leakage from the stress moderating layer 5 could be prevented.

The groove 8 could be formed by forming the core layer 3 and the stress moderating layer 5 in the same manner as Example 1 and then grooving by using a dicing saw. After the groove 8 was formed, an upper clad layer 4 was formed in the same manner as Example 1, so that the groove 8 could be filled with the material same as that for the upper clad layer 4.

Incidentally, also in this Example, the upper clad layer 4 was preferably formed by repeating the formation process a plurality of times. For example, it was preferably to form the layer 4 by at first filling the groove 8 by applying a half of the needed amount of the solution A, successively carrying out UV radiation, and then applying the remaining half of the solution A thereto and carrying out UV radiation. It was same in the following Examples.

EXAMPLE 9

Figure 22:
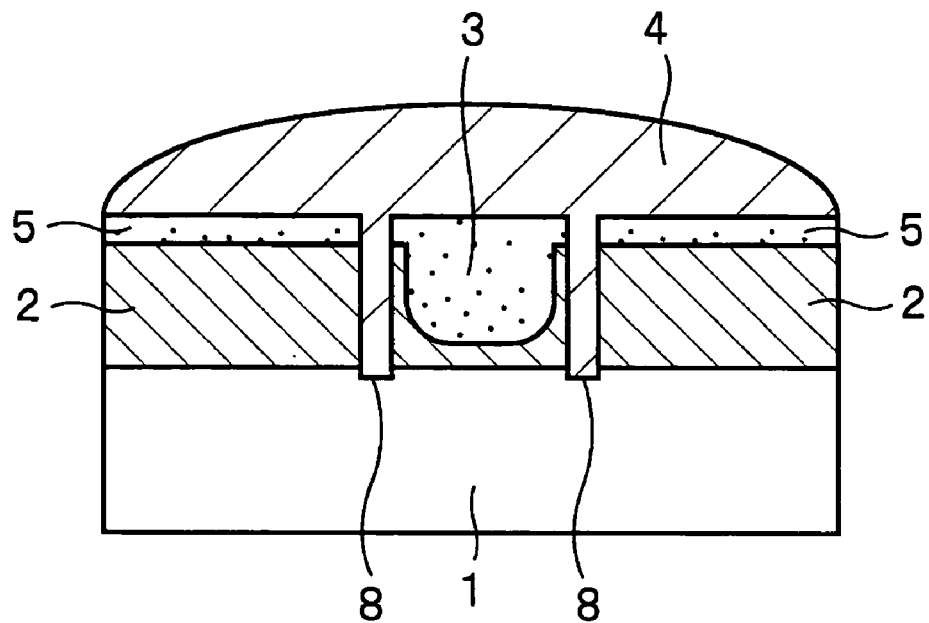
FIG. 22 is a cross-sectional view showing also another example of an optical waveguide according to the invention.

FIG. 22 is a cross-sectional view showing another example of an optical waveguide according to the invention.

In this Example, as the embodiment shown in FIG. 11, a groove 8 for separating a core layer 3 and a stress moderating layer 5 was formed in the stress moderating layer 5 in the vicinity of the core layer 3 and the groove 8 was filled with a material same as that for an upper clad layer 4. Similarly to Example 8, formation of such a groove 8 could prevent light leakage from the core layer 3.

The groove 8 was formed by forming the core layer 3 and the stress moderating layer 5 and grooving by using a dicing saw. After the formation of the groove 8, the groove 8 could be filled with the material same as that for an upper clad layer 4 by forming the upper clad layer 4.

EXAMPLE 10

Figure 23:
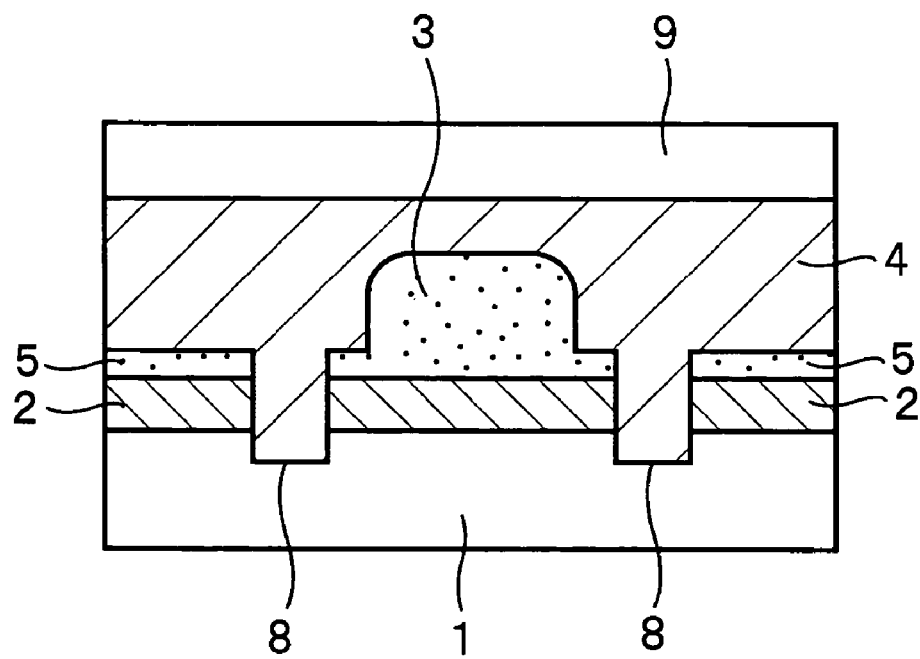
FIG. 23 is a cross-sectional view showing also another example of an optical waveguide according to the invention.
Figure 24:
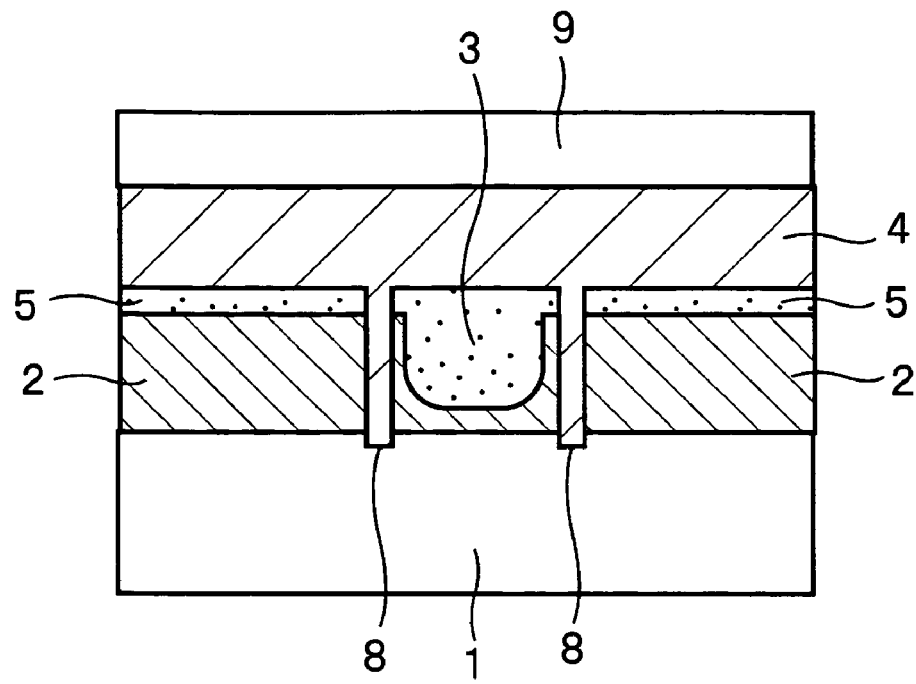
FIG. 24 is a cross-sectional view showing also another example of an optical waveguide according to the invention.

FIG. 23 is a cross-sectional view showing another example of an optical waveguide according to the invention.

This Example differed from Example 8 shown in FIG. 21 in a point that an upper substrate 9 was formed on the upper clad layer 4. As the upper substrate 9, for example, a glass substrate could be employed. Expect that point, this Example was same as Example 8 shown in FIG. 21.

EXAMPLE 11

This Example differed from Example 9 shown in FIG. 22 in a point that an upper substrate 9 was formed on the upper clad layer 4. Expect that point, this Example was same as Example 9.

EXAMPLE 12

Figure 25:
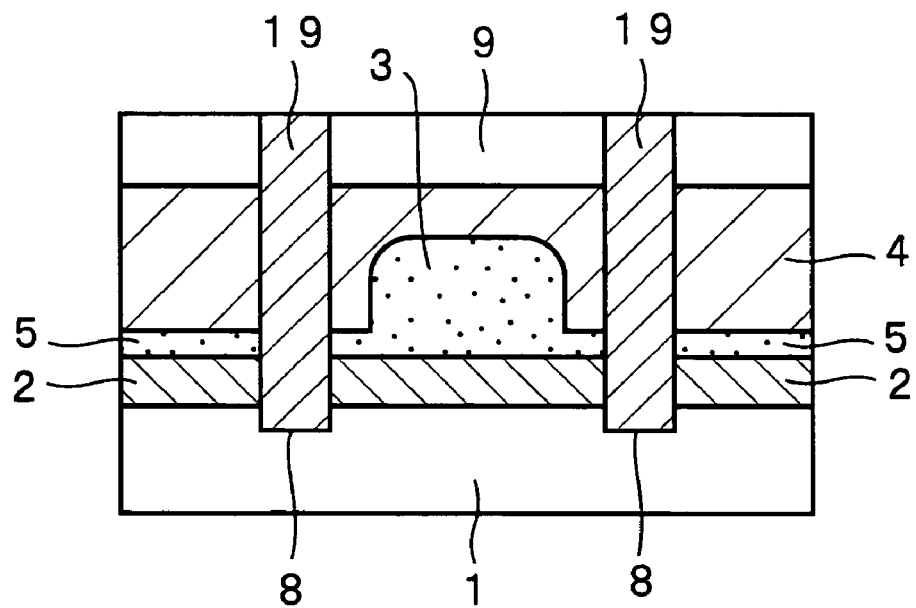
FIG. 25 is a cross-sectional view showing also another example of an optical waveguide according to the invention.

FIG. 25 is a cross-sectional view showing another example of an optical waveguide according to the invention.

In this Example, a groove 8 was formed also in an upper clad layer 4 and an upper substrate 9. The groove 8 was filled with the same material 19 as that for the upper clad layer 4.

In this Example, the upper substrate 9 was installed on the upper clad layer 4 and after that, the groove 8 was formed by using a dicing saw and the formed groove 8 was filled with the same material 19 as that for the upper clad layer 4 to obtain an optical waveguide.

Also, in this Example, light leakage from the core layer 3 could be prevented similarly to the above-mentioned Examples.

EXAMPLE 13

Figure 26:
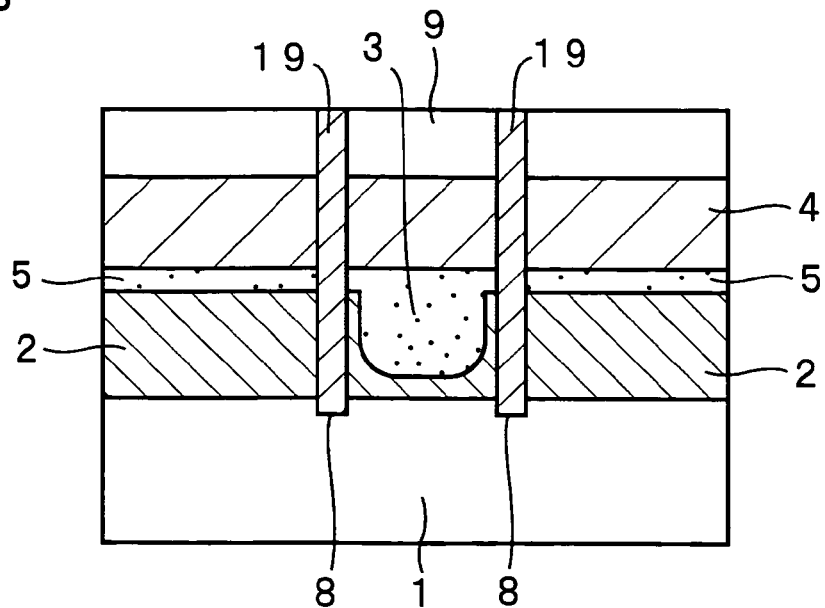
FIG. 26 is a cross-sectional view showing also another example of an optical waveguide according to the invention.

FIG. 26 is a cross-sectional view showing another example according to the invention.

In this Example, a groove 8 was formed in an upper clad layer 4 and an upper substrate 9. Same as Example 12 shown in FIG. 25, after the upper substrate 9 was installed on the upper clad layer 4, the groove 8 was formed by using a dicing saw and the groove 8 was filled the same material 19 as that for the upper clad layer 4 to obtain an optical waveguide.

Also, in this Example, light leakage from the core layer 3 could be prevented by formation of the groove 8.

In the above-mentioned Examples 8 to 13, as the material for filling the groove 8, the same material as that for the upper clad layer 4 is exemplified, however it is not intended that the invention be limited to the described embodiments and any materials may be used if they have a lower refractive index than that of a material for the stress moderating layer 5.

In the above-mentioned respective Examples, the mold was pressed while the core layer was being kept in softened state by heating, however the invention is not limited to that. For example, the core. layer with a prescribed shape may be formed by applying a liquid having a viscosity and cured by UV radiation while a mold being pressed there to. The core layer with a prescribed shape may be formed, for example, by producing a solution by mixing MPTMS 3.6 g, ethanol 16.8 g, hydrochloric acid (2N) 1.6 g, and PhTES 11.7, keeping the solution at 30° C. for 45 hours, removing solvent from the solution by heating the solution at 120° C. for 20 minutes and thereby making the solution be a liquid with a high viscosity, and curing the liquid by UV radiation while pressing a mold thereto as described above.

In the above-mentioned Examples, the respective layers of the optical waveguides are formed from organic-inorganic composites, however among the layers, some of the layers may be formed from organic-inorganic composites and the respective layers may be formed from materials other than organic-inorganic composites.

EXAMPLE 14

Figure 27:
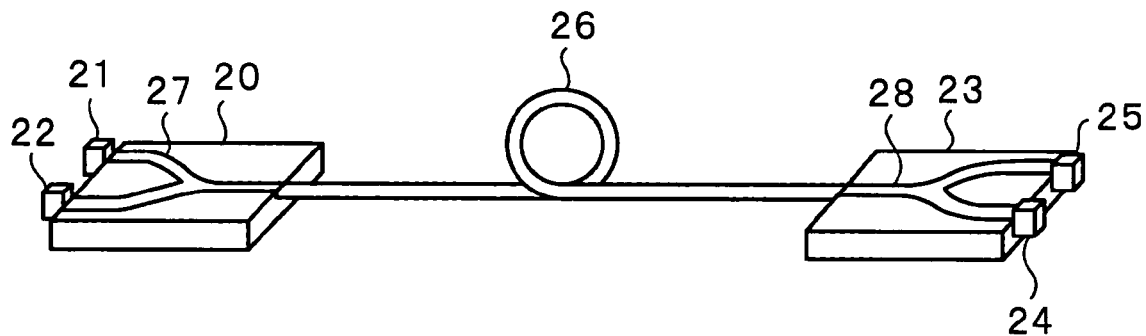
FIG. 27 is a perspective view showing an optical transmission system using an optical transmitter-receiver module.

FIG. 27 is a perspective view showing the optical transmission system using an optical transmitter-receiver module as a device for optical communication of the invention. Optical transmitter-receiver modules 20 and 23 were connected tq both ends of an optical fiber 26. In the optical transmitter-receiver modules 20 and 23, Y-branched optical waveguides 27 and 28 produced from the optical waveguides of Example 1 were installed respectively. End parts of the optical fiber 26 were connected to the tip ends of the Y-branches optical waveguides 27 and 28 and laser diodes 21 and 24 and photo-diodes 22 and 25 were connected respectively to the branched ends of the Y-branched optical waveguides 27 and 28. As the optical fiber 26, a multi-mode optical fiber made of glass with a core diameter 50 µm was employed.

When pulsed wave at 100 kHz was sent from the laser diode 21 of the optical transmitter-receiver module 20, pulsed wave was regenerated from the photodiode 25 of the optical transmitter-receiver module 23. Also, signals from the laser diode 24 were received in the photodiode 22. Accordingly, it was confirmed that the produced system could function as a transmitter-receiver module.

In the following Examples 15 to 19, embodiments where the interface between a stress moderating layer and a clad layer was roughened so as to prevent UV ray radiated for photocuring of an upper clad layer or the like from reaching a lower clad layer will be described.

EXAMPLE 15

[Solution for Forming Core Layer (Stress Moderating Layer)]

3-Methacryloxypropyltriethoxysilane(MPTES) 5.5 ml, phenyltrimethoxysilane (PhTMS) 5.8 ml, an aqueous solution of hydrochloric acid (hydrochloric acid concentration 2N) as a reaction catalyst 1.65 ml, and ethanol 20.5 ml were mixed and left still for 24 hours to hydrolyze and condensation polymerize MPTES and PhTMS. The obtained condensation polymerized solution 4 ml was loaded into a laboratory dish and 1-hydroxy-cycrohexyl-phenyl-ketone 10 mg was dissolved therein as a polymerization initiator. The solution was then heated at 100° C. to evaporate and remove ethanol and obtain a viscous liquid about 1 g. The obtained viscous liquid 1 g was mixed with trimethylethoxysilane 3 ml and trifluoroacetic anhydride 0.8 ml and the resulting mixture was left still for 24 hours and then dried by heating at 100° C. to evaporate and remove excess trimethylethoxysilane and trifluoroacetic anhydride and obtain a solution D. A core layer and a stress moderating layer were formed from the solution D.

[Solution for Forming Clad Layer]

A solution E was produced in the same manner as the case of the above-mentioned solution for forming the core layer (the stress moderating layer), except PhTMS 4.5 ml was used. An upper clad layer and a lower clad layer were formed from the solution E.

The refractive indexes and the storage moduli of the organic-inorganic composites produced from above-mentioned solutions D and E are as follows.

Solution D: the refractive index about 1.519; the storage modulus about 27000 kgf/cm$^2$.

Solution E: the refractive index about 1.515; the storage modulus about 28000 kgf/cm$^2$.

Figure 31:
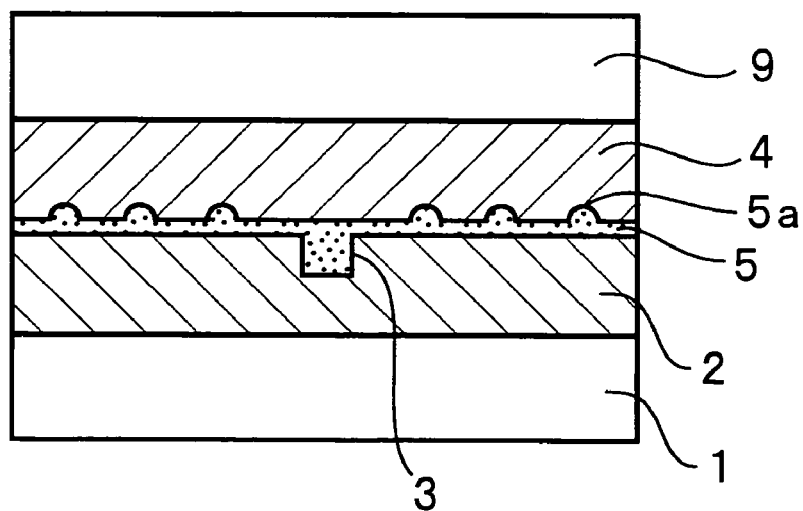
FIG. 31 is a cross-sectional view showing also another example of an optical waveguide according to the invention.

FIG. 31 is a cross-sectional view showing an optical waveguide of this Example. As shown in FIG. 31, the interface between the stress moderating layer 5 and the upper clad layer 4 was roughened to form a surface-roughened part 5a. By forming the surface-roughened part 5a as described above, UV ray was absorbed in the stress moderating layer 5 itself and prevented from reaching the lower clad layer 2. Accordingly, the dose of UV radiation at the time of photo-curing the upper clad layer 4 or the core layer 3 could be set at a high precision with good reproducibility.

Figure 28:
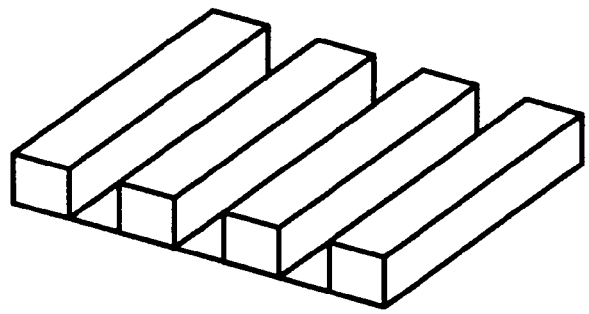
FIG. 28 is a perspective view showing one example of surface-roughened shape formed in the interface of a stress moderating layer with an upper clad layer or a lower clad layer.

The surface-roughened part 5a had a stripe-like shape composed of projected parts and recessed parts as shown in FIG. 28 and formed by arranging semicircular columns with a radius of 0.3 μm in stripes at 0.5 μm pitches. Incidentally, the roughening of the surface-roughened interface 5a was equivalent to the surface roughness $R_{max}$ about 0.3 μm.

Figure 32A:
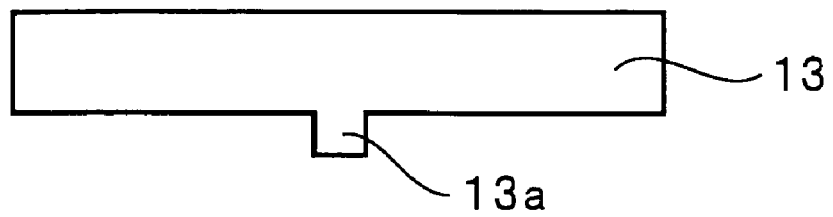
FIG. 32 is a cross-sectional view showing a fabrication process of the example of the optical waveguide shown in FIG. 31.
Figure 32B:
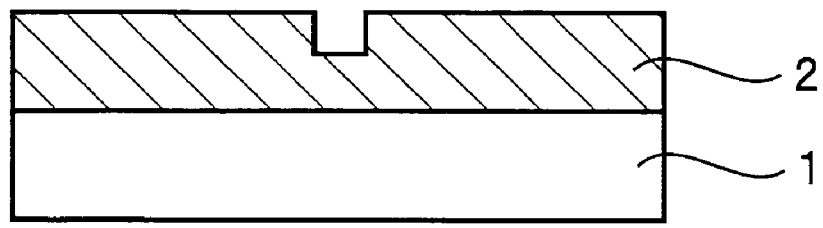
Figure 33A:
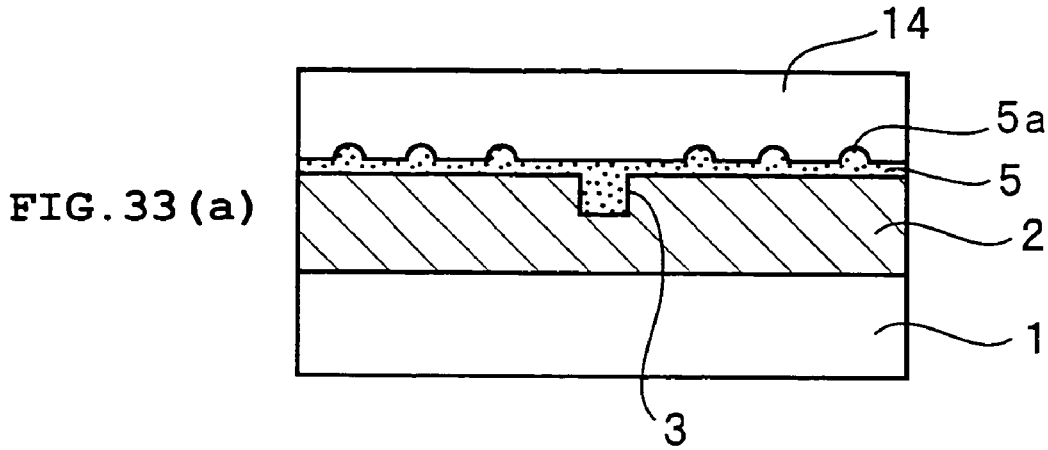
FIG. 33 is a cross-sectional view showing a process fabrication of the example of the optical waveguide shown in FIG. 31.
Figure 33B:
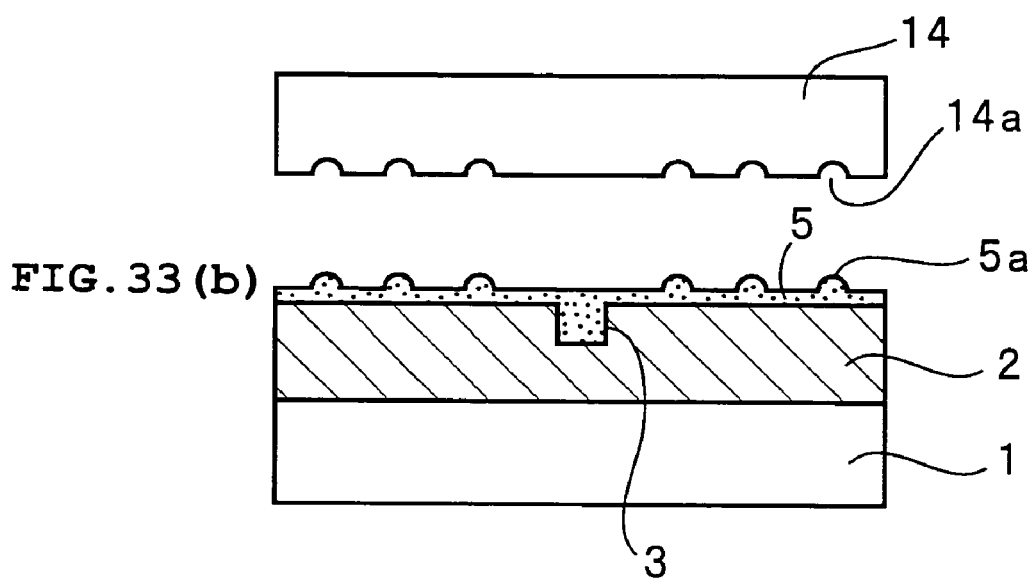

FIG. 32 and FIG. 33 show cross-sectional views for illustrating the fabrication process of the optical waveguide of the embodiment shown in FIG. 31.

At first, as shown in FIG. 32(a), the solution E was dropwise added on a glass substrate 1 and while a mold 13 made of a silicone rubber being pressed, the resulting film was cured by radiating UV ray for 30 minutes by a UV lamp having an intensity of 100 mW and center wavelength of 365 nm to form a lower clad layer 2. The mold 13 had a projected part 13a and the projected part 13a had a width of 7 μm and a height of 7 μm. Accordingly, the core layer formed by the projected part 13a became so-called single mode optical waveguide in 1300 nm or 1550 nm band, which is an optical communication band.

Figure 33C:
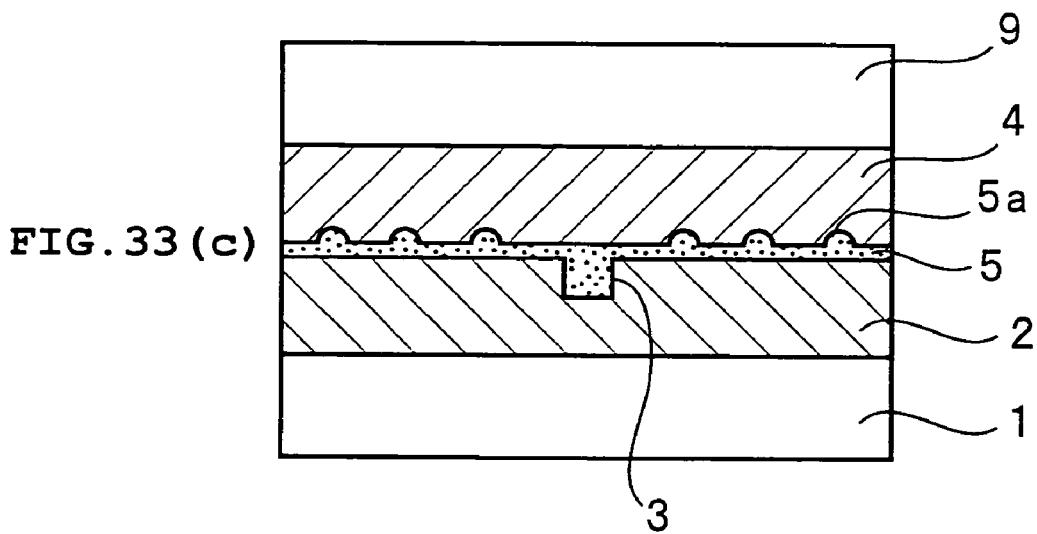

Next, as shown in FIG. 32(b), the solution D was poured in the groove part of the lower clad layer 2 and as shown in FIG. 33C, while a mold 14 made of a silicone rubber being pressed, the solution was cured by radiating UV ray for 30 minutes by a UV lamp having center wavelength of 365 nm to form a core layer 3 and a stress moderating layer 5. The stress moderating layer 5 has an average thickness of 0.5 μm. As shown in FIG. 32(b), the mold 14 had a roughened part 14a corresponding to the roughened surface 5a of the stress moderating layer.

Next, as shown in FIG. 33(d), the mold 14 was taken off, the solution E was dropwise added on the core layer 3 and the stress moderating layer 5 and an upper glass substrate 9 was put thereon and in such a situation, the solution E was cured by radiating UV ray for 30 minutes by a UV lamp having center wavelength of 365 nm to form an upper clad layer 4.

In such a manner, 50 pieces of the sample of the optical waveguide shown in FIG. 31 were produced and the refractive index of the upper clad layer was measured. The refractive index of the upper clad layer was measured by using a prism coupler apparatus after the upper glass substrate was removed. As a result, the dispersion of the refractive index of the upper clad layer was ±0.007%.

For comparison, 50 pieces of a sample of an optical waveguide were produced in the same manner as described above, except that the surface of the stress moderating layer was not roughened and the refractive index of the upper clad layer was measured. As a result, the dispersion of the refractive index of the upper clad layer of this comparative sample pieces was ±0.015%. >From these results, it can be understood that the refractive index of the upper clad layer could be controlled highly precisely by roughening the surface of the stress moderating layer.

EXAMPLE 16

Figure 34:
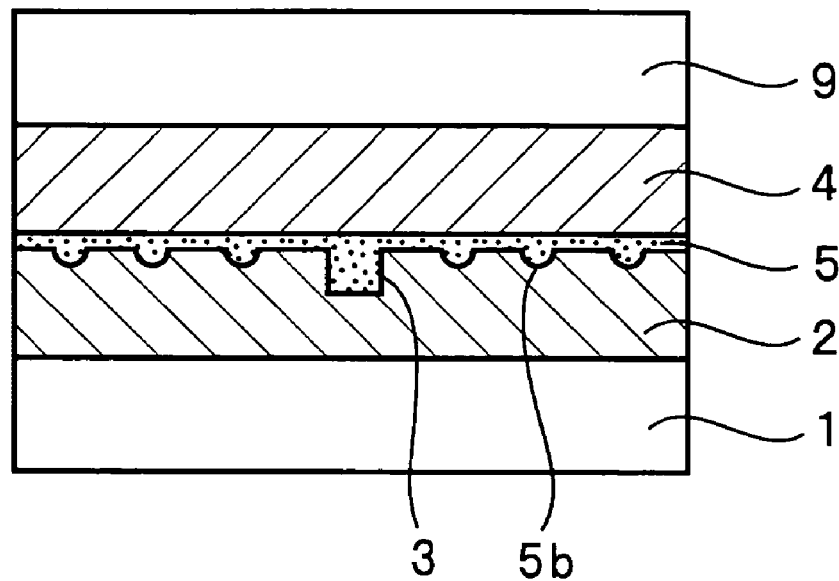
FIG. 34 is a cross-sectional view showing also another example of an optical waveguide according to the invention.

In the same manner as the above-mentioned Example 15, an optical waveguide with a structure shown in FIG. 34 was fabricated. In the embodiment shown in FIG. 34, roughened interface 5b was formed between a lower clad layer 2 and a stress moderating layer 5. The roughened interface 5b had the same shape as that in the above-mentioned Example 15. The roughened interface 5b could be formed in the surface of the lower clad layer 2 by roughening the surface in the corresponding part of the mold 13 shown in FIG. 32(a). Similarly to the above-mentioned Example 15, it was confirmed also in this Example that the refractive index of the upper clad layer 4 was controlled.

EXAMPLE 17

Figure 35:
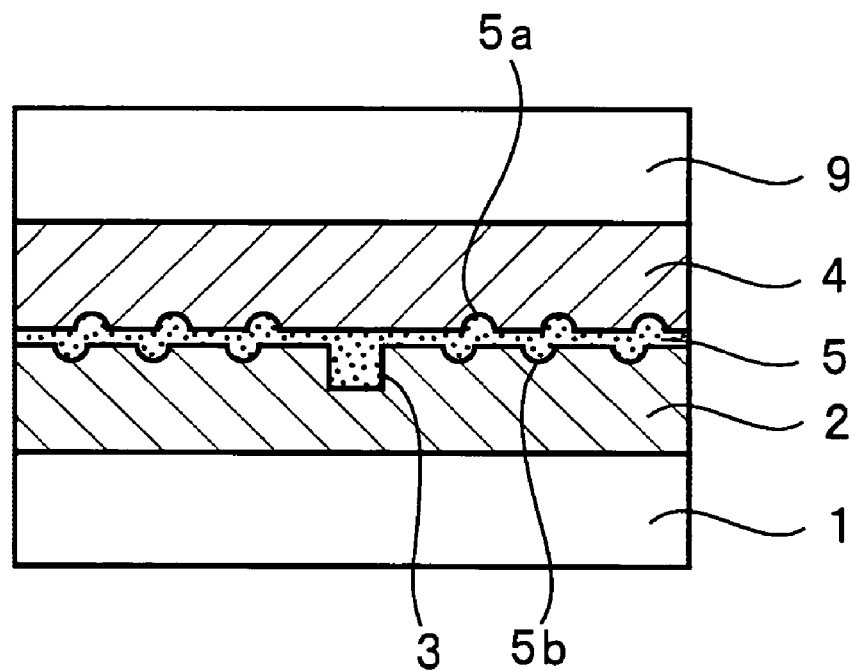
FIG. 35 is a cross-sectional view showing also another example of an optical waveguide according to the invention.

In the same manner as the above-mentioned Examples 15 and 16, an optical waveguide shown in FIG. 35 was fabricated. In the embodiment shown in FIG. 35, roughened interface 5a was formed between a stress moderating layer 5 and an upper clad layer 4 and roughened interface 5b was formed between a stress moderating layer 5 and a lower clad layer 2. By forming such roughened interfaces 5a and 5b as described above, the dispersion of the refractive index of the upper clad layer 4 was further improved and suppressed to ±0.006%.

EXAMPLE 18

Figure 29:
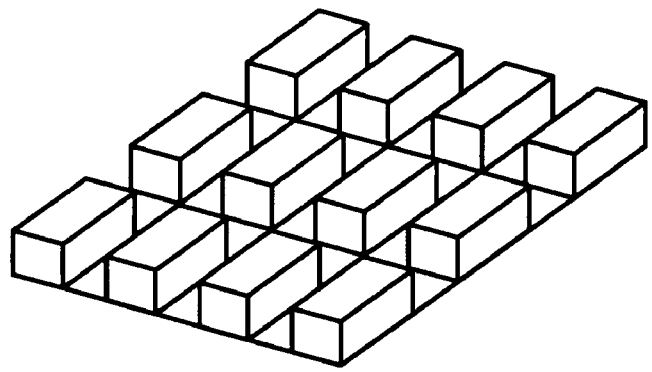
FIG. 29 is a perspective view showing another example of surface-roughened shape formed in the interface of a stress moderating layer with an upper clad layer or a lower clad layer.

An optical waveguide was fabricated in the same manner as Example 15, except that the surface roughening of the stress moderating layer was formed in island-like shape as shown in FIG. 29. The size of each island in the roughened surface was 0.3 μm width, 0,5 μm depth, and 0.5 μm height and the intervals of mutually neighboring islands were 0.5 μm. The surface roughening was equivalent to the surface roughness $R_{max}$ 0.5 μm.

In this Example, the dispersion of the refractive index of the upper clad layer could be suppressed to ±0.006%.

EXAMPLE 19

Figure 30:
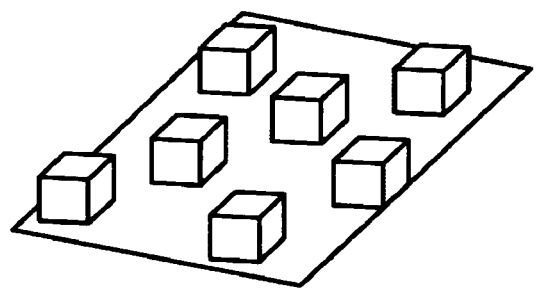
FIG. 30 is a perspective view showing another example of surface-roughened shape formed in the interface of a stress moderating layer with an upper clad layer or a lower clad layer.

An optical waveguide was fabricated in the same manner as Example 15, except that the surface roughening of the stress moderating layer was formed in island-like shape as shown in FIG. 30. The size of each island was 0.3 μm width, 0,5 μm depth, and 0.5 μm height and the density of the islands was set so as to cover about 40% of the surface area of the entire surface of the stress moderating layer with the surface of the islands. The surface roughening was equivalent to the surface roughness $R_{max}$ 0.5 μm.

In this Example, the dispersion of the refractive index of the upper clad layer could be suppressed to ±0.007%.

EXAMPLE 20

[Solution for Forming Core Layer (Stress Moderating Layer)]

3-Methacryloxypropyltriethoxysilane(MPTES) 4.0 ml, diphenyldiethoxysilane (DPhDES) 3.3 ml, an aqueous solution of hydrochloric acid (hydrochloric acid concentration 2N) as a reaction catalyst 1.18 ml, and ethanol 15 ml were mixed and left still for 24 hours to hydrolyze and condensation polymerize MPTES and DPhDES. The obtained condensation polymerized solution 4 ml was loaded into a laboratory dish and 1-hydroxy-cycrohexyl-phenyl-ketone 10 mg was dissolved therein as a polymerization initiator. The solution was then heated at 100° C. to evaporate and remove ethanol and obtain a viscous liquid about 1 g. The obtained viscous liquid 1 g was mixed with trimethylethoxysilane 3 ml and trifluoroacetic anhydride 0.8 ml and the resulting mixture was left still for 24 hours and then dried by heating at 100° C. to evaporate and remove excess trimethylethoxysilane and trifluoroacetic anhydride and obtain a solution F. A core layer and a stress moderating layer were formed from the solution F.

[Solution for Forming Clad Layer]

A solution G was produced in the same manner as the case of the above-mentioned solution for forming the core layer (the stress moderating layer), except DPhDES 2.5 ml was used. An upper clad layer and a lower clad layer were formed from the solution G.

The refractive indexes and the storage moduli of the organic-inorganic composites produced from above-mentioned solutions F and G are as follows.

Solution F: the refractive index about 1.547; the storage modulus about 25000 kgf/cm$^2$.

Solution G: the refractive index about 1.542; the storage modulus about 26000 kgf/cm$^2$.

An optical waveguide was fabricated in the same manner as Example 19, except that above-mentioned solutions F and G were used as solutions for forming core layer (stress moderating layer) and for forming clad layer respectively.

In this Example, the dispersion of the refractive index of the upper clad layer could be suppressed to ±0.007%.

According to the invention, the stress generated by the volume shrinkage at the time of upper clad layer formation can be moderated by a stress moderating layer and consequently, occurrence of cracking and peeling of a lower clad layer and an upper clad layer can efficiently be prevented.

What is claimed is:

1. An optical waveguide comprising
   (a) a lower clad layer;
   (b) a core layer which forms an optical transmission region provided on the lower clad layer;
   (c) an upper clad layer provided on and surrounding the core layer; and
   (d) a stress moderating layer provided in at least one portion between the upper clad layer and the lower clad layer for moderating stress caused by shrinkage of the upper clad layer when formed,
   wherein the stress moderating layer is formed from a material with a smaller storage modulus than that of a material for the upper clad layer and the storage modulus of the stress moderating layer is 100,000 kgf/cm$^2$ or lower at 30° C.

2. The optical waveguide according to claim 1, wherein the upper clad layer is formed from an organic-inorganic composite.

3. The optical waveguide according to claim 1, wherein the stress moderating layer is formed from an organic-inorganic composite.

4. The optical waveguide according to claim 1, wherein the core layer and/or the lower clad layer is formed from an organic-inorganic composite.

5. The optical waveguide according to claim 2, wherein the organic-inorganic composite is produced from an organic polymer and a metal alkoxide.

6. The optical waveguide according to claim 2, wherein the organic-inorganic composite is produced from at least one kind of metal alkoxides.

7. The optical waveguide according to claim 1, wherein the lower clad layer is formed on a substrate.

8. The optical waveguide according to claim 1, wherein the stress moderating layer has a thickness in a range defined as 0.05 µm ≦t≦0.25H, wherein H denotes the thickness of the core layer and t denotes the thickness of the stress moderating layer.

9. The optical waveguide according to claim 1, wherein the stress moderating layer is formed from a material with a refractive index not higher than that of the material for the core layer.

10. The optical waveguide according to claim 1, wherein the stress moderating layer is formed from the same material as that for the core layer.

11. The optical waveguide according to claim 10, wherein the stress moderating layer is formed integrally with the core layer.

12. The optical waveguide according to claim 1, wherein at least one interface of the stress moderating layer with the upper clad layer and the lower clad layer is roughened.

13. The optical waveguide according to claim 1, wherein the corners of the core layer have a rounded shape.

* * * * *